United States Patent
Chow

(10) Patent No.: US 11,090,566 B1
(45) Date of Patent: Aug. 17, 2021

(54) METHOD FOR DETERMINING PLAYER BEHAVIOR

(71) Applicant: Sony Interactive Entertainment LLC, San Mateo, CA (US)

(72) Inventor: Katrine Chow, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/022,666

(22) Filed: Sep. 16, 2020

(51) Int. Cl.
*A63F 13/79* (2014.01)
*A63F 13/58* (2014.01)
*A63F 13/67* (2014.01)

(52) U.S. Cl.
CPC .............. *A63F 13/79* (2014.09); *A63F 13/58* (2014.09); *A63F 13/67* (2014.09); *A63F 2300/5546* (2013.01); *A63F 2300/65* (2013.01)

(58) Field of Classification Search
None
See application file for complete search history.

(56) References Cited

U.S. PATENT DOCUMENTS

| 2001/0039203 | A1* | 11/2001 | Brown | A63F 13/12 463/16 |
| 2006/0246973 | A1* | 11/2006 | Thomas | A63F 13/42 463/4 |
| 2011/0151953 | A1* | 6/2011 | Kim | A63F 13/798 463/1 |
| 2016/0026669 | A1* | 1/2016 | Honda | A63F 13/79 707/749 |
| 2020/0120375 | A1* | 4/2020 | Hamon | H04N 21/234345 |

\* cited by examiner

*Primary Examiner* — Jason T Yen
(74) *Attorney, Agent, or Firm* — Penilla IP, APC

(57) ABSTRACT

Methods and systems for determining behavior of a player playing a video game includes assigning a behavioral value point for the player and for each game item in a gaming scenario of the video game. An action performed by the player and directed toward a specific game item is detected in the gaming scenario. Adjustment value points defined for the action and for the effect of the action on the different game items are identified. A change in the behavioral value points for the player and for each game item affected by the action of the player is dynamically computed by applying adjustment value points defined for the action and for the effect of the action to the corresponding behavioral value points assigned to the player and for each game item affected by the action. The change in the behavioral value points of the player and of each game item affected by the action are examined to establish if the player is exhibiting good behavior or bad behavior.

23 Claims, 10 Drawing Sheets

Player hurting/damaging game items

1st action – Only monster is hit
2nd action – tree damaged substantially
3rd action – neither monster nor tree hit Initial behavioral value point = 100

| Game Item | AVP - Gain/loss (1st action) | AVP - Gain/loss (2nd action) | AVP - Gain/loss (3rd action) | Total behavioral value point | Player's total Game point after 1st action | Player's total Game point after 2nd action | Player's total Game point after 3rd action |
|---|---|---|---|---|---|---|---|
| Player (game character) | +50 | –10 | 0 | 140 | 1000 | 1150 | 1150 |
| Monster | -100 | 0 | 0 | 0 | | | |
| Tree | 0 | -60 | 0 | 40 | | | |

Figure 3A

Player helping other players

1st action – Assisted 2nd player to overcome an enemy
2nd action – assisted 3rd player to overcome a hurdle
3rd action – captured a game tool Initial behavioral value point = 100

| Game Item | AVP - Gain/loss (1st action) | AVP - Gain/loss (2nd action) | AVP - Gain/loss (3rd action) | Total behavioral value point | Player's total Game point after 1st action | Player's total Game point after 2nd action | Player's total Game point after 3rd action |
|---|---|---|---|---|---|---|---|
| Player (game character) | +50 | +50 | 75 | 275 | 50 | 75 | 175 |
| Game character of 2nd player | +50 | 0 | 0 | 150 | 75 | 75 | 75 |
| Game character of 3rd player | 0 | +30 | 0 | 130 | 0 | 60 | 60 |

Figure 3B

Scenario 1 – Only monster is hit

| Game Item | Initial behavioral value point | Adjustment value point - Gain/loss | Total behavioral value point | Player's game points earned (running total) |
|---|---|---|---|---|
| Player (game character) | 100 | +50 | 150 | 0 |
| Monster | 100 | -100 | 0 | 200 |
| Tree | 100 | 0 | 100 | 200 |

Figure 7A

Scenario 2 – Monster fully hit and tree hit accidentally

| Game Item | Initial behavioral value point | Adjustment value point - Gain/loss | Total behavioral value point | Player's game points earned (running total) |
|---|---|---|---|---|
| Player (game character) | 100 | +50 | 150 | 0 |
| Monster | 100 | -100 | 0 | 200 |
| Tree | 100 | -25 | 75 | 220 (Hit once) |

Figure 7B

Scenario 3 – Monster fully hit and tree hit twice accidentally

| Game Item | Initial behavioral value point | Adjustment value point - Gain/loss | Total behavioral value point | Player's game points earned (running total) |
|---|---|---|---|---|
| Player (game character) | 100 | +50 –10 | 140 | 0 |
| Monster | 100 | -100 | 0 | 200 |
| Tree | 100 | -60 | 40 | 240 (Hit twice) |

Figure 7C

Scenario 4 – Monster not hit and tree damaged substantially

| Game Item | Initial behavioral value point | Adjustment value point - Gain/loss | Total behavioral value point | Player's game points earned (running total) |
|---|---|---|---|---|
| Player (game character) | 100 | -70 | 30 | 0 |
| Monster | 100 | 0 | 100 | 0 |
| Tree | 100 | -70 | 30 | 70 |

Figure 7D

Scenario 5 – Monster partially hit and tree damaged substantially

| Game Item | Initial behavioral value point | Adjustment value point - Gain/loss | Total behavioral value point | Player's game points earned (running total) |
|---|---|---|---|---|
| Player (game character) | 100 | +25 -35 | 90 | 0 |
| Monster | 100 | -30 | 70 | 200 |
| Tree | 100 | -70 | 30 | 270 |

Figure 7E

Scenario 6 – No action by the player

| Game Item | Initial behavioral value point | Adjustment value point - Gain/loss | Total behavioral value point | Player's game points earned (running total) |
|---|---|---|---|---|
| Player (game character) | 100 | -30 | 70 | 0 |
| Monster | 100 | 0 | 100 | 0 |
| Tree | 100 | 0 | 100 | 0 |

Figure 7F

METHOD FOR DETERMINING PLAYER BEHAVIOR

TECHNICAL FIELD

The present disclosure relates to behavior exhibited by players during game play of video games, and more specifically determining behavior of the player by evaluating the actions of the player provided during game play.

BACKGROUND OF THE DISCLOSURE

Interactive applications, such as video games, virtual life simulations, educational applications, music applications, etc., have gained popularity in recent years. The vast majority of the video games are streaming three dimensional (3D) video games (also called massively multiplayer online games—MMOG). The MMOG are simultaneously accessed by a large number of users by connecting over a network, such as the Internet. A user of a MMOG application assumes a role of a virtual character or a game icon and controls action of the virtual characters or the game icon using inputs provided via input devices, such as keyboards, game controllers, touch screens, etc. Through the inputs, the user can navigate virtual space and interact with gaming environment and with virtual characters/game icons of other users in accordance to game rules and objectives specified for the video game. Based on the game rules and objectives, the inputs provided by the user may be in collaboration with other users (e.g., as part of a team) to achieve a shared goal or may be in competition with other users (e.g., competitively) to progress in the video game.

The input provided by the user is used to perform a certain action in the gaming environment of the game. For example, the input of a first player may be used to generate an action directed toward a specific game asset or a game icon controlled by a second player within the gaming scenario of the game. In order to advance in the game, some users may perform certain actions that may be considered as harassing or intimidating to other users. These actions can be intentional or unintentional, and are provided as part of the game play or as part of a deliberately orchestrated move. For example, the actions of some users may be deemed intentional when the actions are consistently directed at a specific other user or a specific group of other users and are meant to either intimidate the other users or to prevent the other users from progressing in the game. Similarly, the actions of a user may be deemed unintentional if the actions intended for a specific target (i.e., game asset) affect other game assets or game characters/icons of other users in the gaming scenario in which the user is operating. It is hard to determine the true intentions of a user performing such actions during game play. Oftentimes, the intentions of a first user performing such actions are evaluated based on the experience or feedback from other users that are affected by such actions of the first user. Sometimes the evaluation of other users may be appropriate, while in other times, the evaluation may be biased or immature or inappropriate. This may be because the other users may consider the first user as being aggressive in their game play even when the first user is performing actions that are in accordance to game objectives or game rules. It is therefore hard to just rely on the evaluation or feedback of other users, or to determine the true intentions of the first user.

The intention of a game developer is to enable each user to have a satisfying game play experience and keep the players engaged in the game. The game play experience of a user may be affected by their own actions of not being able to progress in the game, and also by the actions of other user(s) who prevent the user's progress in the game. Aside from the other user preventing the user from progressing in the game, if the other user exhibits abusive or harassing behavior toward the user, the user may lose interest in the game, and depending on the type or nature of the actions of the other user, may avoid playing the game entirely. Similarly, the other user may be incorrectly or immaturely branded as an abusive player even when the other user's actions were unintentional.

It is in this context that embodiments of the disclosure arise.

SUMMARY

Embodiments of the present disclosure relate to systems and methods for accurately determining behavior of a user playing a video game. For all intents and purposes, a user may be a player who is actively involved in playing the game by providing game inputs. The user may also be a spectator who is watching or actively providing comments on the game play of the game of one or more players. Various implementations are described with reference to accurately determining behavior of a user who is a player, but can also be extended to a user who is a spectator viewing and providing comments in relation to game play of one or more players.

The video game is a multi-player game (e.g., MMO game) with a plurality of players accessing the video game and providing game inputs during game play. Various game assets (i.e., game items or sometimes simply referred to as "items") are identified in a gaming scenario of the game where one or more players are present and behavioral value points are accorded to each of the game items identified in the gaming scenario. The game items may be game objects available in the gaming scenario, including avatars or game characters representing or associated with other players. Game inputs provided by a player in the gaming scenario are used to perform an action in the game. The action is evaluated to determine an amount of effect the action has on different game items (e.g., game objects or game characters) present in a gaming scenario of the game where one or more of the plurality of players may also be interacting. The behavioral value points are adjusted for the player and for each item that was affected by the action of the player. The change in the behavioral value points of the player and of the game items (game characters of other players, game objects) are used in determining if the action of the player leans toward good or bad behavior.

As and when the player performs an action, the action of the player is evaluated, in accordance to the game objectives of the game, to determine which ones of the game items are affected by the action and the level at which the game items were affected by the action of the player. Based on the evaluation, the behavioral value points of the game items affected by the action are dynamically adjusted by a predefined adjustment value. In some implementations, depending on an amount of effect the action of the player has on different game items in the gaming scenario, a different adjustment value point may be identified and the behavioral value points of the player and the game items affected by the action are adjusted by the identified adjustment value point. An aggregated behavioral value point for the player is determined using the change in the behavioral value points of the one or more game items that were affected by the action of the player. The adjusted behavioral value points reflecting the change caused by the action of the player are used in establishing whether the player is exhibiting good behavior or bad behavior.

The value points system provides an unbiased evaluation of the action of the player in the gaming environment and assists in determining the intentions of the player during game play. The value points system can not only be used to evaluate the action of a player toward other players or game items in the gaming scenario, but can also be used to evaluate the action(s) of the player in response to other players actions. The action of the player responsive to other players actions in the gaming scenario may be justified (i.e., appropriate) or may be deliberate. The evaluation carried out in association with the game rules and game objectives defined in the game logic of the game reflect a more accurate assessment of the player's behavior in the game, whether it is good behavior or bad behavior.

Recognizing the good behavior of the player is as important as recognizing the bad behavior of the player. When the player exhibits good behavior, the player may be recognized by way of anonymous accolades, elevating status or elevating level of the player, awarding game assets or game points, etc., and such accolades/awards are provided to positively affirm and/or encourage the player to continue to exhibit good behavior. Similarly, when the player exhibits bad behavior, the player may be provided with warnings to fix their behavior and, in some cases, penalized. The penalties and/or warnings may be provided to discourage the player from exhibiting such bad behaviors. In some implementations, the players may be exhibiting bad behavior without even being aware of it. Consequently, providing the warning may assist the player to be aware of and correct their behavior so that all the players can have a positive game play experience. The good or bad behavior of the player is updated to the profile of the player and used during game play to inform other players or to warn the player, for example. Tracking of the behavior of the player may be specific to a session of game play, specific to a game or specific to the player. As a result, the behavior of the player may be initialized for every game session of the game, or may be maintained for the different game sessions of the game, or may be maintained for different game sessions of different games that the player accesses on the game cloud system, for example.

In one implementation, a method for determining behavior of a player playing a video game is disclosed. The method includes assigning a behavioral value point for the player and for each game item in a gaming scenario of the video game currently accessed by the player. An action performed by the player is detected in the gaming scenario, wherein the action is directed toward a specific game item in the gaming scenario. Predefined adjustment value points defined for the action and for an amount of effect caused by the action on the different game items affected by the action, are identified. A change in the behavioral value points for the player and for each game item affected by the action of the player is dynamically computed by adjusting the corresponding behavioral value points assigned to the player and for each game item affected by the action, using the predefined adjustment value points defined for the action and for the amount of effect caused by the action on each game item affected by the action. The change in the behavioral value points of the player and of each game item in the gaming scenario affected by the action are examined to establish if the player is exhibiting good behavior or bad behavior.

In one implementation, a time stamp associated with the action is identified. The changes occurring in the gaming scenario of the video game is correlated to the action to identify game items affected by the action. The correlation is enabled using the time stamp of the action. The changes in each game item resulting from the action is evaluated to define the effect of the action on the respective game item.

In one implementation, when the action of the player affects only a specific game item in the gaming scenario in accordance to objective of the video game, the behavioral value point of the player is incremented, and the behavioral value point of the specific game item is correspondingly decremented by the predefined adjustment value point defined for the amount of effect caused by the action.

In one implementation, dynamically computing the change in the behavioral value point includes maintaining a positive value point log and a negative value point log for the player and for each game item in the gaming scenario, and updating the positive value point log or the negative value point log of the player by a corresponding predefined adjustment value point based on the amount of effect caused by the action on each game item affected by the action.

In some implementations, the positive value point log and the negative value point log for the player is maintained for a plurality of game sessions of the video game and updated during current game session of the video game.

In some implementations, the positive value point log and the negative value point log for the player is maintained for a plurality of video games played by the player and are updated during current game session of the video game.

In some implementations, when the action targeting the specific game item affects only the specific game item and is in accordance to game objectives of the video game, the positive value point log for the player is incremented with the predefined adjustment value point defined for the action, and when the action targeting the specific game item affects different game item instead of the specific game item, the negative value point log for the player is incremented with the predefined adjustment value point defined for the action.

In some implementations, when the action targeting the specific game item affects only the specific game item in accordance to game objectives of the video game, incrementing the negative value point log of the specific game item using the predefined adjustment value point identified for the amount of effect caused by the action, and when the action targeting the specific game item affects a different game item instead of the specific game item, incrementing the negative value point log of the different game item using the predefined adjustment value point defined for the amount of effect caused by the action; and when the action targeting the specific game item affects the specific game item and a different game item, incrementing the negative point log of each of the specific game item and the different game item using the predefined adjustment value point defined for the amount of effect caused by the action.

In some implementations, an entry is generated in the positive value point log or the negative value point log maintained for the player and for each game item using the adjustment value point identified for the action and for each game item affected by the action. The positive and negative value point logs including a plurality of entries identified for different actions of the player in the video game. The change is computed for the action by aggregating the adjustment value points collected in the positive value point logs of the player and of each of the game items affected by the action to generate a consolidated positive adjustment value point for the player, and aggregating the adjustment value points collected in the negative value point logs of the player and of each of the game items affected by the action to generate a consolidated negative adjustment value point for the player, wherein the consolidated positive adjustment value point and the consolidated negative adjustment value point quantifies the effect of change that occurred in the gaming scenario due to the action.

In some implementations, the change is evaluated by comparing the consolidated positive adjustment value point with the consolidated negative adjustment value point for the player. When the consolidated positive adjustment value point is greater than the consolidated negative adjustment value point by at least a predefined threshold value, the player performing the action is established to be exhibiting good behavior during game play of the video game. Similarly, when the consolidated negative adjustment value point is greater than the consolidated positive adjustment value point by a predefined threshold value, establishing that the player performing the action is exhibiting bad behavior during game play of the video game. The consolidated positive adjustment value point and the consolidated negative adjustment value point are applied to the behavioral value point of the player, the updated behavioral value point of the player is used for evaluating subsequent action of the player in the video game.

In some implementations, the change is evaluated by aggregating the value points collected in the positive value point log of the player to generate an aggregate positive value, and aggregating the value points collected in the negative value point log of the player to generate an aggregate negative value for the player. When the aggregate positive value is greater than or equal to a predefined threshold value, the player is established to exhibit good behavior during game play of the video game. When the aggregate negative value is greater than or equal to a predefined threshold value, the player is established to exhibit bad behavior during game play of the video game. The aggregate positive value and the aggregate negative value are applied to the behavioral value point of the player, the updated behavioral value point of the player is used for evaluating subsequent action of the player in the video game In some implementations, the behavioral value points with the change for each of the player and the game items affected by the action of the player are stored for use in subsequent game play sessions of the video game.

In some implementations, when the player is exhibiting good behavior, the player is provided with incentives, wherein the incentives are monetary or game-related.

In some implementations, when the player is exhibiting bad behavior, the player is penalized, wherein the penalty is game-related.

In some implementations, when the player is exhibiting bad behavior, the player is provided with a warning, wherein the warning includes information related to the action that caused the player to exhibit bad behavior and provide guidance to encourage the player to correct the action.

In some implementations, the adjustment value points for applying to the behavioral value points of the player and of each game item affected by the action of the player is dynamically determined based on a type of action and amount of effect the action had on each game item affected by the action of the player in the gaming scenario. The change in the behavioral value point for the player includes change in the behavioral value point for each said game item affected by said action of the player.

In an alternate implementation, a method for determining behavior of a player playing the video game is disclosed.

The method includes assigning a behavioral value point for the player and for each game item in a gaming scenario of the video game currently accessed by the player. An action performed by the player is detected in the gaming scenario, wherein the action is directed toward a specific game item in the gaming scenario. A player adjustment value point for adjusting the behavioral value point of the player and a game item adjustment value point for adjusting the behavioral value point for each game item in the gaming scenario affected by the action of the player are identified. The player adjustment value point is identified from game play metrics of other players that have performed the action during game play of the video game and the game item adjustment value for each game is determined based on an amount of effect caused by the action of the player on each game item affected by the action. The behavioral value point for the player is dynamically adjusted using the player adjustment value, and the behavioral value point for each game item affected by the action of the player is dynamically adjusted using the corresponding game item adjustment value identified for the amount of effect of the action on the respective game item. The behavioral value points for the player and for each game item affected by the action are evaluated to establish if the player is exhibiting good behavior or bad behavior.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

FIGS. 3A and 3B illustrates example of computing behavior value points and the game points for a player based on actions performed by the player within the gaming scenario, in some example implementations.

FIGS. 7A-7F illustrate different example scenarios of effect of an action on different game items within a gaming scenario of the video game and the value points accorded to the player and the game items in the gaming scenario to reflect the effect of the action, in accordance with some implementations of the present disclosure.

DETAILED DESCRIPTION

Figure 1:
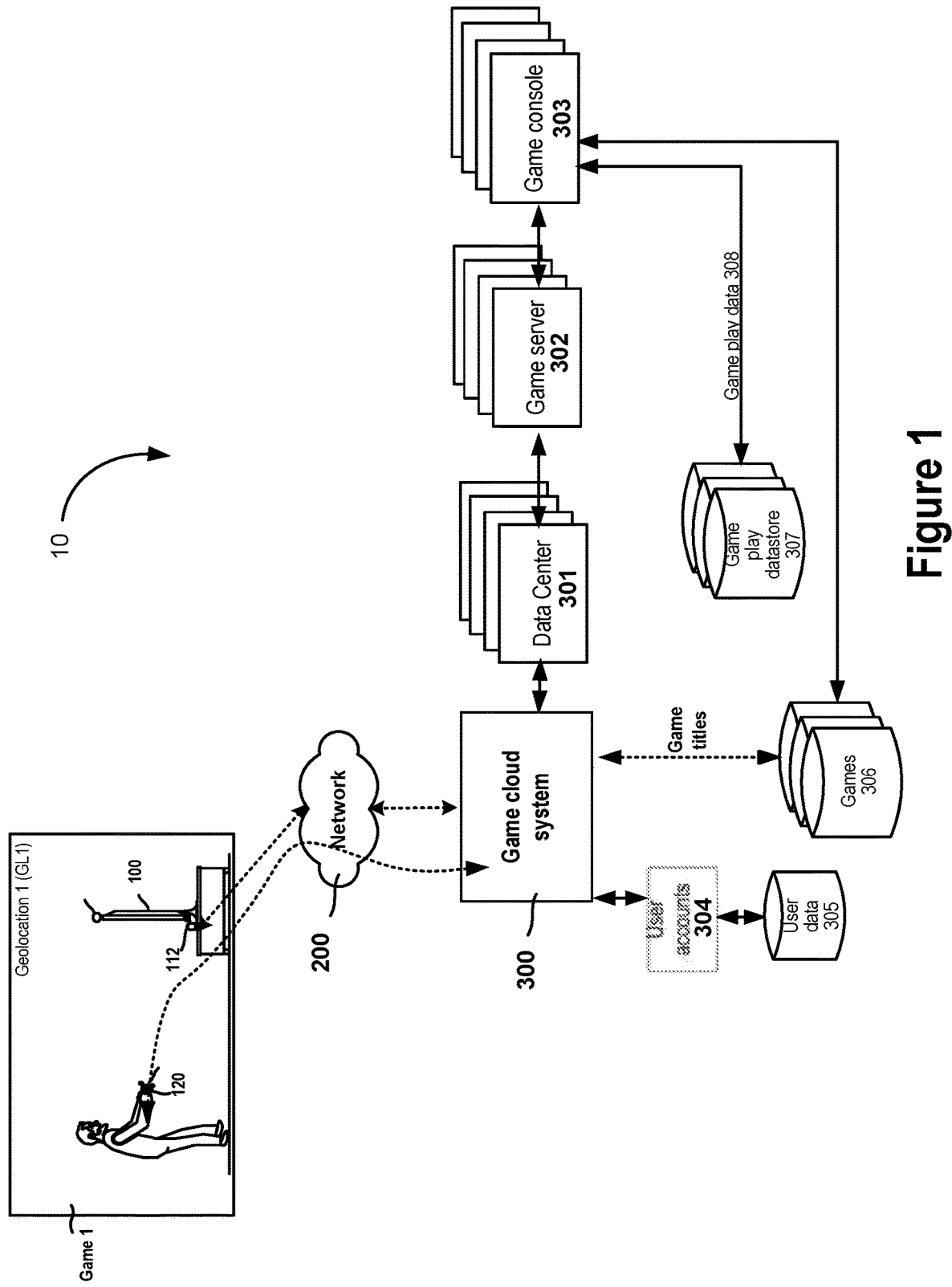
FIG. 1 illustrates a simplified conceptual game cloud site for receiving game inputs of a player that is used to determine behavior of the player in the video game, in accordance with one implementation of the disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

In a massive multi-player video game, a plurality of players select a video game (or simply referred to as "game") for game play from a game cloud server and provide game inputs to perform certain actions in the game. The video game may be a streaming video game that provides frames of game content for rendering on client devices of the plurality of players, in response to the game inputs from the plurality of players. The game inputs provided by a player are used to perform an action, which affect game items in a gaming scenario accessed by the player where a plurality of game items is disposed. The game items, also referred to herein as game assets, may include background assets (i.e., non-player game items or non-player game assets), such as mountains, rivers, tree, building, billboard, castles, dungeons, etc., and foreground assets, such as game characters (e.g., icons/game objects/avatars) associated with the player and one or more of other players, monsters, etc. The game items included in the gaming scenario may include static or stationary game items and moving game items. Further, any game item that is involved in the storyline of the video game (e.g., foreground assets, such as game characters, moving game items (e.g., monsters, flying objects, etc., that have a part in the video game (i.e., game items providing game points or game tools/keys for unlocking a puzzle or a treasure chest or a room or a building, etc.) etc.) may be considered as an essential game item. Any game item that is not involved in the storyline of the video game (e.g., background items such as items that make up the scenery of the video game) may be considered as a non-essential game item.

The game inputs provided by the player are interpreted to generate actions that are directed toward one or more game items/game characters in the gaming scenario. Some or all of the game items (i.e., some or all of the essential and/or non-essential game items) in the gaming scenario may be affected by an action generated from the game inputs provided by the player. In the MMO game, the video game receives the game inputs from the plurality of players, interprets the game inputs to generate specific actions that are to be performed in a gaming scenario accessed by the players, and responsively generate frames of game content that is streamed to the client device of the plurality of players for rendering. The video game executing on the game cloud server is capable of live streaming the game play over a network, such as the Internet. The plurality of players may be accessing the video game from one geolocation or from multiple geolocations.

The game inputs provided by each of the plurality of players and the corresponding actions performed in the gaming scenario of the video game are part of game play data maintained for the video game and stored in a game play datastore. The actions are used to influence a game state of the video game. The game state of the video game identifies overall state of the video game at a particular point and is influenced by intricacies of the game play of each of the plurality of players. The game play data is processed by game logic of the video game to generate frames of content that is forwarded to client devices of the plurality of players for rendering. The game play data also includes any game customization provided by the respective player for the video game. The game customization of each player is stored as saved data.

The game play data provides detailed information related to game play style of each of the plurality of players, from which the game behavior, game progression, game play competency, skill level, etc., of the respective player can be easily deduced. In addition to details of the player, the game play data captures characteristics of each gaming scenario of the video game accessed by each of the plurality of players, characteristics of each action generated from the game inputs of each player, effects of such action in the gaming scenario, etc., which are processed to determine overall game state of the game. Characteristics of a gaming scenario may include details of game items available in the gaming scenario, such as type (e.g., static game items, moving game items, etc.) and number of game items included in the gaming scenario, characteristics of the game items, such as location, size, color, shape, texture, etc., game item(s) targeted by an action generated from game inputs of each player, a number of game items that are affected by the action of the player, state of each game item in the gaming scenario including state of game item(s) affected by the action, amount of effect caused by the action of the player on each game item, etc. The static game items in the gaming scenario may include a bush, a tree, a front yard, a back yard, a street, a building, a billboard, a bridge, non-player game characters (e.g., statues, images, etc.) provided by game logic, etc., and moving game items (i.e., dynamic game items) may include game characters or icons or avatars controlled by the player and/or by other players, monsters, dragons, a basketball in motion, a flying object, a runner, a galloping horse, a launched missile, etc. The gaming scenario represents a location within the game where at least one game item (i.e., a static game item or a moving game item) is disposed, wherein the game item may be related to the background or the foreground of the gaming scenario, etc. The game items in the gaming scenario appear in one or more frames of streaming game content provided for rendering on the client devices of the players.

Game inputs of a player are interpreted by the game logic to define one or more actions that can be performed in the gaming scenario. Some examples of actions that can be generated from game inputs of the player include moving a game item by pushing or pulling or throwing or sliding the game item, shooting at a game item, interacting with a game item (e.g., interacting with game character of another player, throwing a hand-grenade, throwing a ball, killing or blocking a game character (non-player or player game character), unlocking a door, opening a box, etc.), providing comments related to or directed toward a game character, etc. The game inputs are interpreted based on the context of the gaming scenario to define an appropriate action. The characteristics of the action of the player are used to determine the game item targeted by the action, type of game item targeted by the action, number of other game items that are impacted (i.e., affected) by the action, amount of impact on the targeted game item and on each of the other game items affected by the action, etc. These characteristics of the action are evaluated to determine the behavior of the player in the video game. Based on the evaluation, the player is determined to exhibit good behavior or bad behavior. Each action of the player is evaluated during or after the game play session of the game and the behavior of the player is updated. The updated behavior of the player is stored in the user profile of the player and is used during subsequent game play session of the game and/or of a different game.

Generally, most of the players that play the video game exhibit good behavior by providing game inputs to generate actions that are in accordance to the game objectives of the game. The actions generated by the players are directed toward game characters associated with specific other player(s) or toward one or more game items. However, there are some players that may periodically or consistently exhibit bad behavior. Some of the bad behavior exhibited by the players may be intentional or unintentional. Additionally, these players may exhibit bad behavior in one video game while exhibiting good behavior in other video games, or vice versa. Due to the bad behavior exhibited by some of the players, the overall game play experience of the other players playing the video game may get adversely affected to the extent that the other players may avoid playing the game or prematurely exit out of the game when they notice presence of the player(s) who are known to or have previously exhibited bad behavior in some portion of the video game. In some cases, the player(s) exhibiting bad behavior may not even be aware that their behavior is bad. In order to correctly identify the behavior of each player in the video game, properly identify a player who is exhibiting good/bad behavior and specific actions of the player that defined them as good/bad players, and to provide an enriching game play experience for all players, various implementations of systems and methods of the present disclosure are described.

The systems and methods are designed to evaluate the game inputs of each player to identify the actions performed by the player in the gaming scenario. The actions may or may not affect the game items/game characters that the player intended to target. As a result, a behavior analysis engine executing on a game cloud system, in association with the game logic of the game, is used to evaluate the action, identify the different game items that are affected by the action of the player, determine an amount of effect the action has on the different game items, and quantify the effects of the action on the different game items using a value point system. The action of the player may be directed toward a particular game item or game character. However, based on the context of the game play, the action of the player may affect one or more other game items instead of or in addition to the game item that the player's action was targeting.

In some cases, the player's action may consistently target a specific other player's game character in the gaming scenario. The behavior analysis engine keeps track of the various game items that are affected by the actions of the player and determines if the player is consistently targeting specific game item (i.e., game character of another player), type of action performed the specific game item, effect of such action, etc. As part of keeping track, behavioral value points are initially assigned to the player and to each of the game items in the gaming scenario in which the player is operating. In some implementations, only essential game items are accorded behavioral value points. In another implementation, both essential and non-essential game items are accorded behavioral value points. When an action from a player is detected, the behavioral analysis engine determines the type of action generated by the player and identifies adjustment value points for applying to the behavioral value points of the player generating the action and for the different game items affected by the action of the player. Different adjustment value points may be defined for different actions and for different effects that each action has on the different game items. For example, a killing action may be assigned a different adjustment value point than a blocking action. Similarly, an action that completely destroys or significantly damages a game item (e.g., an opponent's game character) may be assigned a different adjustment value point than an action that just grazes the game item (e.g., opponent game character or another game item).

The behavioral analysis engine, in response to the action from the player, identifies the player that generated the action and the game items in the gaming scenario that was affected by the action of the player. The behavioral analysis engine then dynamically adjusts the behavioral value points of the player and of each game item in the gaming scenario affected by the action using the corresponding adjustment value point identified for the action and for the amount of effect that the action has on the respective game item. The behavioral analysis engine may obtain the information related to the action and its effects on different game items from the game play data generated for the game. The resulting behavioral value point of the player and of the game items are used to determine the behavior of the player.

When the behavior of the player is determined to be bad, the behavior analysis engine, in collaboration with the game logic of the game, may forward a warning to the player during game play, either through private message or through overlays, popups, etc.) requesting them to adjust their behavior in the game so as to provide a satisfying game play experience to all players. The player may be tagged appropriately to identify the player's behavior and this tag may be updated to the user profile of the player maintained in the user datastore. If the player continues to exhibit bad behavior in the game, the behavior analysis engine may adopt additional actions against the player, such as penalizing the player by limiting the player's access to the game for game play. Limiting the access may include reducing the activities the player can perform in the game, in one implementation. In alternative implementation, the player may be completely blocked from the game by invalidating the player's account for the game. The extreme step of blocking the player may be adopted when the player continues to exhibit the bad behavior in spite of repeated warnings to fix their behavior. When the player corrects their behavior in the game, either in response to the warning or otherwise, the behavior analysis engine may detect the change and update the user profile of the player maintained in the user datastore 305. The updated user profile of the player is used to restore access to the game (if the player had restrictive access) and, in some implementations, additional incentives, such as accolades, game incentives, recognition, access to additional game features, etc. On the other hand, when the player exhibits good behavior, the player may be provided with incentives to encourage the player to continue exhibiting good behavior. The incentives may be monetary or game-related incentives.

Each player's behavior in game play affects the overall quality of game play of other players. The systems and methods described herein assist in maintaining the quality of the game play of the game by tracking each player's behavior and warning the player exhibiting bad behavior to correct their behavior and, in some cases, limiting the player's access to certain features of the game or by blocking the player from accessing the game for game play. Maintaining the quality of the game play of the game by encouraging good behavior and retaining or incentivizing players exhibiting good behavior ensures that the limited and precious system resources, such as server resources, network resources, graphic resources, etc., are optimally used for running the game and providing game play data for the good players. Similarly, discouraging bad behavior and either limiting or blocking players exhibiting bad behavior from accessing certain features or the entire game assists in conserving the system resources and ensuring the system resources are not unnecessarily stressed or expended to service bad players that are reducing the quality of game play for other players.

With the general understanding of the inventive embodiments, example details of the various implementations will now be described with reference to the various drawings.

FIG. 1 provides an overview of a game cloud site 10 used for accessing games for game play. The game cloud site 10 includes a plurality of client devices 100 (100-1, 100-2, 100-3, ... 100-n) associated with a plurality of players and other users, wherein the client devices are communicatively connected to a game cloud system 300 over a network 200. The game cloud system (GCS) 300 is configured to host a plurality of games and other interactive applications, such as social media applications, content provider applications (e.g., music streaming applications, streaming video applications, etc.), etc. The plurality of players may access the GCS 300 from a single geolocation or from a plurality of geolocations. The client devices 100 can be any type of client computing device having a processor, memory, and communication capabilities to access the network 200, such as LAN, wired, wireless or 4G/5G, etc., and may be portable or not portable. The client devices 100 may run an operating system and include network interfaces to access the network 200 or could be thin clients with network interface to communicate with the GCS 300 via network 200, wherein the GCS 300 provides the computation functions. For example, the client devices can be smart phones, mobile devices, tablet computers, desktop computers, personal computers, wearable devices, connected televisions, or hybrids or other digital devices that include monitors or touch screens with a portable form factor.

The client devices 100 having 5G communication capabilities may include mobile devices or any other computing devices that are capable of connecting to 5G networks. In one implementation, the 5G networks are digital cellular networks, where the service areas are divided into a plurality of "cells" (i.e., small geographical areas). Analog data generated at the mobile devices are digitized and transmitted as radio waves to a local antenna within a cell using frequency channels that can be reused in geographically separated cells. The local antenna is connected to Internet and telephone network by a high bandwidth optical fiber or other similar wireless communication. The 5G networks are capable of transmitting data at higher data rates as they use higher frequency radio waves for communication and, as a result, provide lower network latency.

Players may access a video game available at the GCS 300 using a user account 304. In response to an access request for a game for game play from a player, the user account 304 of the player is verified against the user accounts maintained in a user datastore 305. In addition to verifying the user account of the player requesting access to the GCS 300, the game identified in the request is verified against a games datastore 306 to determine if the player is authorized to access and play the video game, prior to providing access to the video game. The verification is done by identifying all the game titles available at the GCS 300 that the player is eligible to view or play and validating the game title included in the player's request against the identified game titles. The games datastore 306 maintains a list of game titles that are or can be hosted at the GCS 300 and when new games are introduced, the game titles, game code and information related to the new games are updated to the games datastore 306. It should be noted that although the various embodiments are described in relation to a video game (also referred to as "game"), the embodiments can be extended to include any other interactive applications, such as streaming music applications, streaming video applications, etc.

After successful verification of the user and the game title included in the request, the GCS 300 identifies a data center 301 where the game can be hosted and sends a signal to the identified data center 301 to load the game associated with the game title identified in the request. In some implementations, more than one data center 301 may be hosting or capable of hosting the game. In these implementations, the GCS 300 identifies a data center 301 that is geographically proximal to the geolocation of the player. The geolocation of the player may be determined using Global Position System (GPS) mechanism within the client device 100, the client device's IP address, the client device's ping information, the player's social and other online interactions performed via the client device 100, to name a few. Of course, the aforementioned ways to detect the geolocation of the player are provided as examples and it should be noted that other types of mechanisms or tools may be used to determine the geolocation of the player. Identifying the data center 301 proximal to the geolocation of the player is to reduce the latency when transmitting game related data between the client device 100 of the player and the game executing at the identified data center 301. When more than one player requests to access the game for game play, as will be the case in a MMO game, additional data centers 301 may be identified within the GCS 300, wherein each additional data center 301 is identified to be proximal to one or more players.

The data center 301 may include a plurality of game servers 302 and a game server 302 is selected based on the resources available at the game server 302 for hosting the game. In some implementations, an instance of the game may be executed on one or more game servers 302 either within the identified data center 301 or across multiple data centers 301.

In some implementations, the identified data center 301 may have some but not all of the necessary resources (e.g., bandwidth, processing, etc.) to host the game. In such implementations, the GCS 300 may identify a second data center 301 that is geographically proximal to the geolocation of the player and has the necessary resources to complement the resources available in the first data center 301 to host the game. The game is hosted on both the first and the second data centers and the game play data is synchronized between the first and second data centers.

The game cloud system 300 loads the game to the one or more game servers 302 in the identified data center(s) 301. The one or more game servers 302 include the hardware/software resources to satisfy the requirements of the game. The game server 302 may be any type of server computing device available in the GCS 300, including a stand-alone server, etc. Further, the game server 302 may manage one or more virtual machines supporting a game processor that executes an instance of the game for the player, on a host.

In some implementations, the one or more servers 302 may include a plurality of game consoles 303 and the game cloud system 300 may identify one or more game consoles within the identified one or more servers 302 to load the game. Each of the one or more game consoles may be an independent game console, or may be a rack-mounted server or a blade server. The blade server, in turn, may include a plurality of server blades with each blade having required circuitry and resources for instantiating a single instance of the game, for example. Of course, the game console described above is exemplary and should not be considered restrictive. Other types of game consoles, including other forms of blade server may also be engaged for executing an instance of the identified game. Once the one or more game consoles or game servers are identified, the generic game-related code for the game is loaded onto the identified game consoles 303 or game servers 302 and made available to the players requesting the game for game play.

In other implementations, the video game may be executed locally at the client devices 100 and metadata from the executing video game may be transmitted over the network 200 to the game server(s) 302 at identified data center(s) 301 of the GCS 300 for affecting the game state and for sharing the game play data with other players and users (e.g., spectators, influencers, such as advertisers, sponsors, etc.).

Game inputs to affect game state of the game may be provided by the players using input devices, such as mouse 112, keyboard (not shown), etc.) or control interface (e.g., touch screen, etc.) associated with the client device 100, or from a hand-held controller (or simply referred to as "controller") 120 or any other peripheral device that is communicatively connected to the client device 100. Game inputs provided by each player are analyzed to determine the game behavior of the respective player. The game inputs provided by each player during a game play session are part of game play data 308 that is stored in game play datastore 307. The game play datastore 307 stores the game play data for each player, for each game play session, and for each game. The game play data 308 is used by the behavior analysis engine to generate a behavior model for each player (i.e., an artificial intelligence (AI) model). The behavior model for each player is refined as and when additional game play data is available for the player. In one implementation, the additional game play data may be specific to the game and may include game inputs of the player from different game play sessions of the game. In an alternate implementation, the game play data and the additional game play data are collected for the player from different game play sessions of a plurality of games played by the player and used to create and refine the behavior model for the player. In yet another implementation, the game play data and the additional game play data are collected from different game play sessions of a plurality of games played by a plurality of players and used in generating and refining the behavior model for the player.

The MMO game includes a game engine (not shown) communicatively connected to game logic of the game in order to provide a framework for the game. The game engine, generally speaking, is a software layer that serves as a foundation for a game, such as the MMO game, and provides the framework that is used to develop the video game. The game engine abstracts the details of doing common related tasks (i.e., game engine tasks) required for every game, while the game developers provide the game logic that provides the details of how the game is to be played. The game engine framework includes a plurality of reusable components for processing several functional portions (i.e., core features) for the video game that bring the video game to life. The basic core features that are processed by the game engine may include physics (e.g., collision detection, collision response, trajectory, movement of object based on gravity, friction, etc.), graphics, audio, artificial intelligence, scripting, animation, networking, streaming, optimization, memory management, threading, localization support, and much more. The reusable components include process engines that are used to process the core features identified for the game.

During game play of the game, the game engine manages the game logic of the game, collects and transmits players game inputs received from one or more input devices associated with client devices 100, to the game logic. The game engine further manages, in an optimal manner, the allocation and synchronization of the functional portions of the game engine to process game play data generated by the game logic and generates frames of game content that is transmitted back to the client devices 100 for rendering. A variety of game engines are currently available to provide different core functionalities and an appropriate game engine may be selected based on the functionalities specified for executing the video game.

The game inputs provided by each player during game play are interpreted to define actions that are performed in the gaming scenario. The actions affect one or more game items that are available within the gaming scenario, which affect game state of the game. The game state of the game identifies overall state of the game at a particular point and is influenced by intricacies of the game inputs provided by each player. The game inputs of each player, the game actions generated from the game inputs, the effect of the actions of each player on the game items available in each gaming scenario are saved as game play data. The game play data also includes the saved data of each player, wherein the saved data of a player includes any game customization provided by the player for the game. The game inputs of each player included in the game play data are used to generate a behavior model that is trained using additional game play data received from the respective player for the game. The behavior model may be generated for each player and trained using the game inputs from different game play sessions of the player and of the other players, wherein the game inputs of the players and of the other players may be collected from different game play sessions of the game. In some implementations, the behavior model may also be trained using game inputs of the plurality of players collected from different games. The trained behavior model is used to determine which actions are considered to be bad, which actions are considered to be good, which game inputs generated such actions, frequency of such actions (i.e., consistency of such behavior from the player), were actions deliberate or accidental, etc. Using the details from the behavior model, the system can establish a player as good or bad. In some implementations, the behavior of the player may be established based on how the behavior of the other players' generating same or similar actions, was evaluated. The actions of the player are continuously monitored and the game behavior of the player is continuously evaluated to ensure that the behavior of the player established by the system accurately reflects the intentions of the player expressed through their actions.

Figure 2:
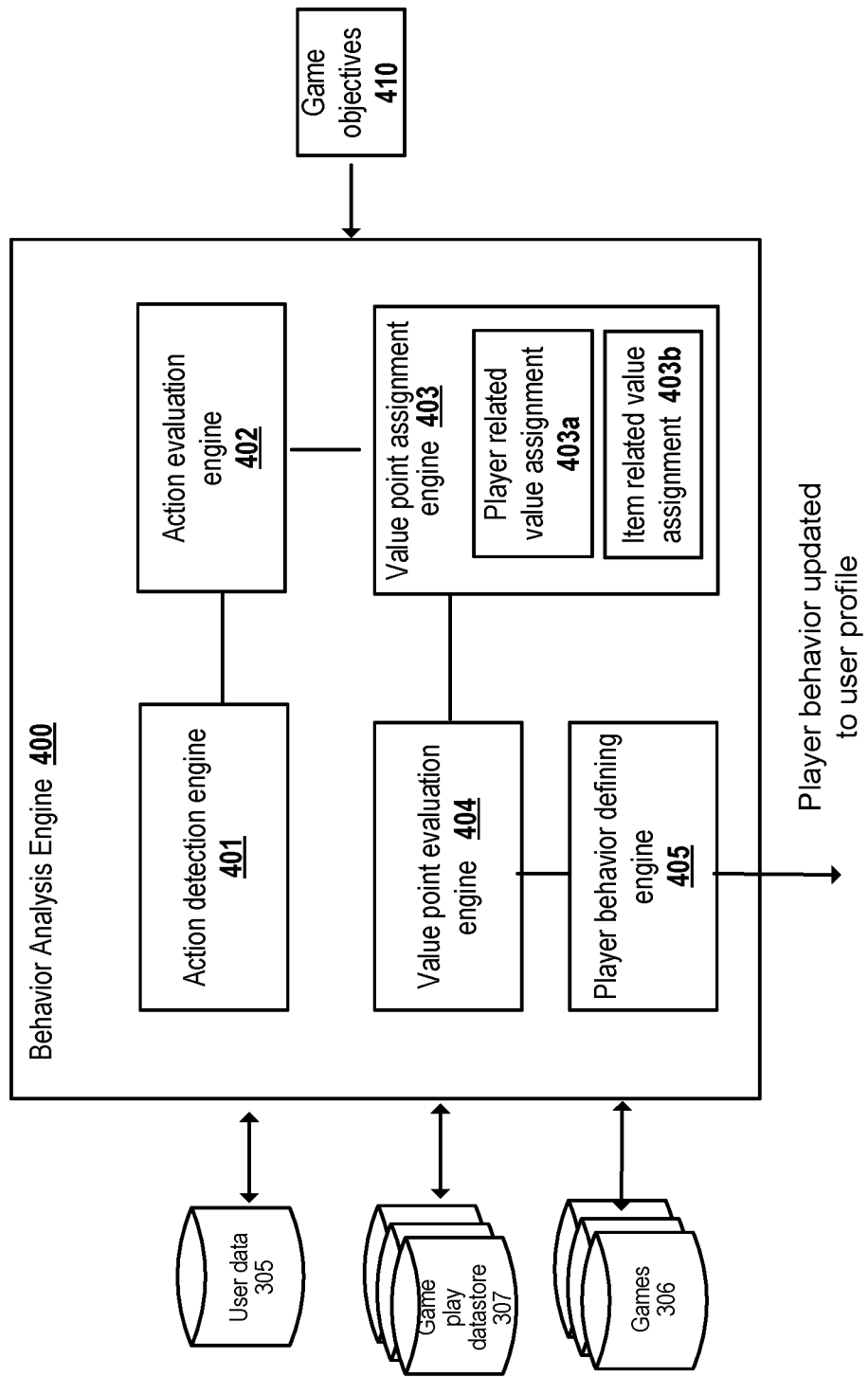
FIG. 2 illustrates a simplified block diagram of different modules within a behavior analysis engine used to determine behavior of a player based on actions generated from game inputs of the player, in accordance with one implementation of the present disclosure.

FIG. 2 illustrates a simplified block diagram of a behavior analysis engine 400 that is used to receive and process the game inputs of a player playing the video game and to determine the behavior of the player during game play. The behavior analysis engine 400 may be integrated within the game logic, or may be distinct from the game logic of the game and executed either on the same server or on a different server as the game logic. In the case of the behavior analysis engine 400 being executed on a different server, the different server executing the behavior analysis engine 400 is communicatively coupled to the server executing the game logic of the game, so as to collaborate with the game logic to determine the behavior of the player.

The behavior of the player may be used to encourage the player to continue to exhibit good behavior and to discourage the player from exhibiting bad behavior. The player may be provided with warning or suggestion to improve their behavior so as to ensure enriching game play experience for all players that select the game for playing. Discouraging the players based on their behavior may include preventing the players from accessing the game or certain portions of the game. Controlling the access correlates to reduced number of players accessing and playing the game. Reduced number of players correlates to reduced amount of system resources expended for the game play of the game. It is advantageous to use the system resources optimally while continuing to provide an enriching game play experience to the players.

The behavior analysis engine 400 includes a plurality of modules that assist in identifying and processing the game inputs of the player so as to determine the behavior of the player. Some example modules includes action detection engine 401, action evaluation engine 402, value point assignment engine 403, value point evaluation engine 404 and player behavior defining engine 405, to name a few. In some implementations, one or more of the modules can be integrated into other modules. In other implementations, additional modules may be included to perform finer processing of the game inputs to define the game play behavior of the player.

The action detection engine 401 is configured to receive game play data generated by the game logic of the game and to identify the action performed by the player in the gaming scenario of the game by interpreting the game inputs provided by the player during game play. For example, a button press (i.e., game input) may be provided via a controller used by the player to provide the game input for the game. The game inputs provided by the player may be proactive or reactive in nature, and may be targeting a specific game item (i.e., game objects or game characters of other players) that is present in the gaming scenario. The game inputs (e.g., the button press on the controller) of the player are interpreted by the game logic, in accordance to context of the game occurring in the gaming scenario, to generate an action that is to be performed on the specific game item. Some of the actions that may be performed include launching a missile (in a war game), throwing a ball (in a basketball game), unlocking a door (in a treasure hunt game), allowing a game character to jump from a top of a first building to a top of a second building (in a fictional action game), damaging a game asset, preventing another player's game character from advancing, interacting with the game avatar or game character of another player that may be perceived as aggressive or offensive or collaborative or supportive, etc.

The action detection engine 401 identifies and evaluates the action performed by the player in the gaming scenario of the game to identify attributes of the generated action, such as type of action, direction, location, speed, context, etc., of the action. The attributes of the action identified by the action detection engine 401 are provided to the action evaluation engine 402 as input.

The action evaluation engine 402 uses the attributes of the action provided by the action detection engine 401 to evaluate characteristics of the action performed by the player. The evaluation is performed to determine if the action performed by the player was in accordance to the game objectives of the game or was deliberate or was accidental. Details of the role of the action evaluation engine 402 will be discussed with reference to FIG. 4.

The information collected by the action evaluation engine 402 is provided as input to the value point assignment engine (or simply referred to as "assignment engine") 403. In order to assess the true intentions of the player, a value point system is employed by the assignment engine 403 to assign behavioral value points to different game items, adjust the assigned behavioral value points to the different game items affected by the action, and to evaluate the adjusted points of the different game items after each action of the player is completed. The assessment of the player's actions is performed by assigning an initial behavioral value point for the player providing the game input that generates the action and to each of the other players whose game characters are in the gaming scenario. Similarly, an initial behavioral value point is assigned to each of the game items 403b included in the gaming scenario. The behavioral value points may be predefined by the assignment engine 403. In some implementations, the behavioral value points assigned to each game item and each game character in the gaming scenario may be same. In alternate implementations, the behavioral value points may vary based on the type of game item in the gaming scenario. For example, a moving game item may be assigned a different behavioral value point than a stationary game item. In another example, game items may be assigned different behavioral value points based on the size, shape, purpose (e.g., essential vs. non-essential) of the game item in the gaming scenario, etc. Purpose of the game item, in one implementation, may be measured by the value of the game item in the game. For example, a game item that provides game points when interacted with or is a game tool that can be used to overcome or assist in a challenge (e.g., a key to unlock a certain challenge/section of the game), etc., may be considered to have a purpose in the game. Game items (e.g., mountain, hills, ocean, sky, stars, etc.) that are included in the game as part of a background scene and are not associated with any game points in the game are considered to not have any purpose in the game but are provided as visual treat to the player. The assignment engine 403 determines the type of each game item included in the gaming scenario, the purpose of the game item in the game, and identifies appropriate behavioral value points to assign for each game item.

Similarly, the initial behavioral value points 413a assigned by the initial behavioral value point engine 413 to the player and to a game character of another player may be different from the initial behavioral value points assigned to the game items 413b in the gaming scenario. In one implementation, the behavioral value point assigned to the game character of another player may be same behavioral value point assigned to the player providing the action. In alternate implementation, the game character of another player may be assigned different behavioral value point than the one assigned to the player providing the action. For simplicity sake, in one example, each of the game items, game characters of other players and the player generating the action are all assigned same behavioral value points—e.g., 100 points.

In addition to assigning the behavioral value points, the assignment engine 403 also defines adjustment value points to apply to the behavioral value points assigned to the different game items in the gaming scenario. These adjustment value points are used to quantify the effect of the action on the different game items. The actions are quantified by determining amount of effect of the action on different game items, and identifying the appropriate adjustment value points that correspond to the amount of effect on the different game items. In one implementation, the adjustment value point defined for the player is based on the type of action performed by the player, the type of game item targeted, type of game items affected by the action, and the extent of effect or influence the action had on the different game items in the gaming scenario where the action was performed. The adjustment value point for the player, for the other players and for the game items affected by the action may be defined to be different for different actions generated from the player's game inputs. For example, the missile launching action may have a defined adjustment value point (e.g., 100 points) for the player, which may be different from the adjustment value point defined for a running action (e.g., 50 points) or a rowing action (e.g., 75 points) or a jumping action (e.g., 120 points) or a flying action (e.g., 150 points), etc. In alternate implementations, the adjustment value point for the player may be the same for all types of actions generated by the player in the game. Additionally, the adjustment value points for the different game items affected by an action (e.g., launching, running, rowing, jumping, etc.) may be defined to vary based on the extent of effect or influence the action had on the different game items targeted or affected by the action. The adjustment value points identified for different game items and game characters are used to adjust the corresponding behavioral value points of the respective game items/game characters affected by the action of the player.

To understand the value point assignment, an example of a simple gaming scenario in which the player is currently interacting is described. In this example, the gaming scenario includes a game character representing the player, a monster that is moving, and a tree (i.e., stationary game item). The player, as part of game play, launches a missile to destroy or hit the monster and, in the process, hits the tree that is proximate to the location of the monster when the monster was hit. In this example, the assignment engine 403 assigns the behavioral value point for each of the player, the monster and the tree to be equal to 100 points. Additionally, the assignment engine 403 pre-defines or dynamically defines adjustment value point for each game item affected by the launched missile action based on the extent of effect or influence the missile launching action had on the game items. The action may only affect some game items and not all game items in the game. Further, the extent of effect the action has on the game items affected by the action may vary. In this example, the tree is hit and so has an adjustment value point that correlates with the amount of damage to the tree. If the missile also hit the monster, then the monster will also have an adjustment value point assigned to it for the launching action.

In order to identify and assign the appropriate adjustment value point to each game item affected by the action, the assignment engine 403, in one implementation, is configured to evaluate the amount of effect or influence the action had on each game item in the gaming scenario and define the adjustment value point for the respective game item. In one implementation, the adjustment value point assigned to each game item is defined as a percentage of the initial behavioral value point assigned to the respective game item, wherein the percentage is based on the extent of effect of the action on the game item. As each game item is affected differently or not at all, the adjustment value point assigned to the different game items in the gaming scenario vary and may be based on the game objectives of the game. In the missile launch example, the launched missile may have completely destroyed the monster that the action targeted, while the tree that was in the vicinity of the monster was partially affected. As the destruction of the monster was the game objective of the game, the adjustment value point for the monster, in one implementation, is defined to be the initial behavioral value point (i.e., 100 points) assigned to the monster. Since the tree was partially damaged, the adjustment value point for the tree may be defined as a percentage of initial behavioral value point of the tree. The percentage may be defined based on the extent of damage. Thus, if the tree was 50% destroyed, then the adjustment value point of the tree was defined to be 50 points (50% of initial behavioral value point of 100 points). In addition to assigning the adjustment value point for the game item, the adjustment value point for the player may be defined by the assignment engine 403 based on the type of action initiated by the player's game inputs. In one implementation, the adjustment value point for the missile launch may be predefined to be 50 points. In one implementation, the adjustment value point defined for each game item affected by the action is indicative of the amount of effect the action of the player had on the respective game item.

In the above simplified example, the gaming scenario was shown to include only 3 game items/game characters (game character of the player, monster and tree), whereas in reality, depending on the complexity of the game, the gaming scenario of the game may include a plurality of game items. Further, depending on the type of action performed by the player, only some of the game items and/or game characters present within the gaming scenario may be affected or all the game items may be affected, and none of the game items may be affected. Consequently, the assignment engine 403 computes the adjustment value points for only those game items/game characters that are affected by the action of the player and such computation is done after each action is performed in the gaming scenario of the game.

Once the behavioral value points and the adjustment value points for the different game items, game characters of other players and the player are determined, the assignment engine 403, forwards the defined value points of the different game items/game characters to the value point evaluation engine (or simply referred to as "point evaluation engine") 404. The point evaluation engine 404 quantifies the effect of the action on the various game items by first applying the adjustment value points defined for the action for the various game items (i.e., game characters of the player and of the other players, other game objects) to the corresponding behavioral value points assigned to the respective game items affected by the action to generate corresponding adjusted behavioral value points for the different game items affected by or involved in the action. The adjusted behavioral value points for each of the game items are analyzed to determine if the player is exhibiting good behavior or bad behavior. Details of the role of the point evaluation engine 404 in determining the behavior of the player will be discussed in more detail with reference to FIG. 6.

The behavior of the player determined from analyzing the behavioral value points for each game item affected by the action of the player, is updated to the profile of the player. Declaring the overall behavior of the player based on one action may be immature and may not reflect the true intention of the player, unless such action is accompanied with other indicators or explicit declarations from the player. As a result, after each action of the player, the point evaluation engine 404 examines the state of the game items in the gaming scenario affected by the actions of the player to determine if the actions of the player consistently or frequently targets certain one(s) of the game items or game characters in the gaming scenario, and whether such actions are in accordance to the game objectives (i.e., game mechanics) of the game or not.

In some implementation, machine learning logic within the point evaluation engine 404 may be used to perform the analysis in order to evaluate the behavior of the player. The machine learning logic may not only utilize the game play data from the current game session but also game play data for the game from previous game sessions of the player. The game play data for the game from several game play session of the player helps the machine learning logic to determine whether the player has a tendency to act in a not so good way (i.e., has a tendency to exhibit behavior that leans toward bad behavior). Based on the game play history of the player, if the player is known to have a tendency to exhibit behavior that is bad or is leaning toward bad, the machine learning logic may, during evaluation of the actions in the current game session, evaluate the player's actions more strictly and/or flag the player as a bad player faster than other players who have not exhibited such behaviors in earlier game play sessions. By flagging the player as a bad player faster, the behavior analysis engine 400 may be able to notify or warn the player sooner to allow the player to fix their behavior. Similarly, for a player who has no game play history of the game or is not known to exhibit behavior that is bad or leaning towards bad, the machine learning logic may evaluate the actions of such player more leniently and provide sufficient time for the player to exhibit good behavior or provide warning to fix their behavior.

The machine learning logic is not only able to evaluate the actions of the player to flag the player as bad, it is also able to flag the player as good, when the actions of the player justifies such labeling. Similar to warning the player to fix their bad behavior, the behavior analysis engine 404 may be used to encourage the player to continue exhibiting good behavior and, in some cases, incentivize the player to encourage them to continue exhibiting good behavior. Details of the role of the machine learning logic of the point evaluation engine 404 will be described in detail with reference to FIG. 6. The information from the point evaluation engine 404 is forwarded to the player behavior defining engine (or simply referred to as "behavior defining engine") 405.

The behavior defining engine 405 uses the output from the point evaluation engine 404 to establish the behavior exhibited by the player during the current game session of the game. The established behavior of the player is updated to user profile of the player.

The behavior scoring system using point value is configured to run parallel to the game scoring system that keeps track of the player's status in the game. The behavior scoring system does not correlate with the game scoring system as the behavior scoring system is used to keep track of the actions and, in some implementations, the non-actions of the player and the effect of such actions or non-actions in the gaming scenario, while the game scoring system is used to keep track of the player's status in the game and is not affected by the player's non-actions. The behavior scoring system is used to check whether the player's actions are within the parameters of the game mechanics of the game and to determine cumulative effect of the actions of the player, while the game scoring system is used to determine the player's winnings, losings, penalties, awards, etc., that are used to define the overall status of the player and the overall state in the game. The behavior score resulting from the cumulative effects of a plurality of actions of the player assists in quantifying the actions of the player and to flag the player's behavior as good or bad based on the cumulative effects.

FIGS. 3A and 3B illustrate some example action evaluation performed using the machine learning logic to determine the behavior of the player, in some implementations. FIG. 3A illustrates the actions of the player that adversely affect the game item in the gaming scenario and FIG. 3B illustrates the actions of the player that are collaborative as these actions are performed to assist other players in the gaming scenario. FIG. 3A illustrates 3 different actions performed by the player and the effect of each of the actions on the different game items included in the gaming scenario. To keep the example simple, the gaming scenario is shown to include only 3 game items—i.e., a game character of the player, a monster that is a moving game item, and a tree that is a stationary game item. It is to be noted that the gaming scenario can have additional game items dispersed in the gaming scenario, wherein the additional game items may be stationary or moving. The three actions performed by the player are targeting the monster. In the first action, the player hits the monster completely destroying it and does not affect any other game items. As a result, the player is awarded an adjustment value point (AVP) of +50 (i.e., a gain in the behavioral value point). Since the monster got completely destroyed, the adjustment value point of the monster will be the initial behavioral value point assigned to the monster, which is 100 points. The behavioral value point of the tree is not affected as the first action did not affect the tree. Meanwhile, the player is awarded 1000 game points for the action that hit the monster. It is noted in the current implementation that the first action may be the very first action of the game and so the behavioral value point of each of the game items is adjusted using the initial behavioral value point. In other implementations, the behavioral value points of each game item may be different depending on the effect of the actions of the player and of the other players on the respective game item in the gaming scenario. Further, in the current implementation, the behavioral value point assigned to each and every game item is the same. In alternate implementations, the behavioral value point assigned to each game item may be different depending on the type of game item (e.g., game character vs. game object, moving vs. stationary, etc.).

The player's second action in the gaming scenario misses the monster but hits and damages the tree substantially. This can happen when the monster is moving around in the gaming scenario and comes proximal to the tree but moves out of the way just in time to avoid getting hit by the player's action. As a result, since the game objectives of the game was to hit the monster, the adjustment value point for the player in response to the second action is −10 points since the tree, which was not the intended target, was damaged. The adjustment value point for the monster in response to the second office action, is zero, since the monster was not affected by the second action. The adjustment value point for the tree is −60 since the effect of the second action on the tree was substantially damaged. Further, the adjustment value point of the tree is shown to be a negative value since the tree is not the intended target. Meanwhile, the game point for the player for the second action is incremented by 150.

The player's third action in the gaming scenario results in hitting neither the monster nor the tree. As a result, the adjustment value points for the player, the monster and the tree for the third action is zero. The game point for the player remains the same for the third action, as no game item was captured and no tools or points were earned. At the end of the third action of the player, the total behavioral value point for the player was 140 (initial value point+any gain/loss earned from the actions—i.e., 100+50−10). Similarly, the total behavioral value point for the monster is zero (100−100), and for the tree is 40 (100−60). As can be seen, the behavioral value point of the player (140) is not correlated to game point (1150) as the behavioral value point increases or decreases depending on the effect of the actions of the player on the different game items, while the game point is shown to steadily increase.

FIG. 3B illustrates another example where each action of the player is used to assist another player or to accumulate in-game winnings. As in the example illustrated in FIG. 3A, the example in FIG. 3B shows the player performing 3 actions. In the first action, the player (i.e., the first player) assists a second player to overcome an enemy. The machine learning logic recognizes the player's collaborative action and assigns behavioral value points in accordance to the amount of assistance the player provided to other players in the game. Accordingly, responsive to the first office action, the player is assigned +50 behavioral value points for assisting in overcoming an enemy. Similarly, the second player is assigned +50 behavioral value points in recognition of the second player overcoming the enemy. In the second action, the player assists a third player to overcome a hurdle. The player may provide assistance, for example, by providing the sequence of operations the third player has to perform to overcome the hurdle in the gaming scenario. Based on the evaluation of the action, the player may be assigned +50 behavioral value points for assisting while the third player is assigned +30 behavioral value points for overcoming the hurdle with some help. The behavioral value point of the second player remains unchanged during the second action as the second action is related to the third player and not the second player. Continuing with the game play, when the player performs a third action of capturing a game tool, the player is assigned +75 behavioral value points for capturing the game tool and the positive value is to indicate that the player captured the game tool without adversely affecting any other game item in the gaming scenario. The second and the third players' behavioral value points are not affected by the third action of the player.

At the end of the third action, the total behavioral value points of the player, the second player and the third player are computed. The player's behavioral value point after assisting two players and gaining a game tool is equal to the initial behavioral value point+any adjustment value points gained/lost during each action (i.e., 100+50+50+75, for a total of 275 points). Similarly, the behavioral value point of the second player is equal to 150 (initial value point (100)+ adjustment value point (+50)), and of the third player is equal to 130 (initial value point (100)+adjustment value point (+30)). The player's total game point after $1^{st}$ action is shown to be 50 points, after $2^{nd}$ action it is 75 points, and after third action it is 175 points. The second player's total game point is 75 for overcoming the enemy, and the third player's total game point is shown to be 60 for overcoming the hurdle. As can be seen from the examples illustrated in FIGS. 3A and 3B, the adjustment value points assigned for the different actions are based on the effect the different actions have on the different game items and the amount of assistance provided to the different game characters in the gaming scenario. The game points are assigned to each player based on the gaming criteria defined for the game, which may include staying alive and free, capturing game items/points in the game, etc.

Figure 4:
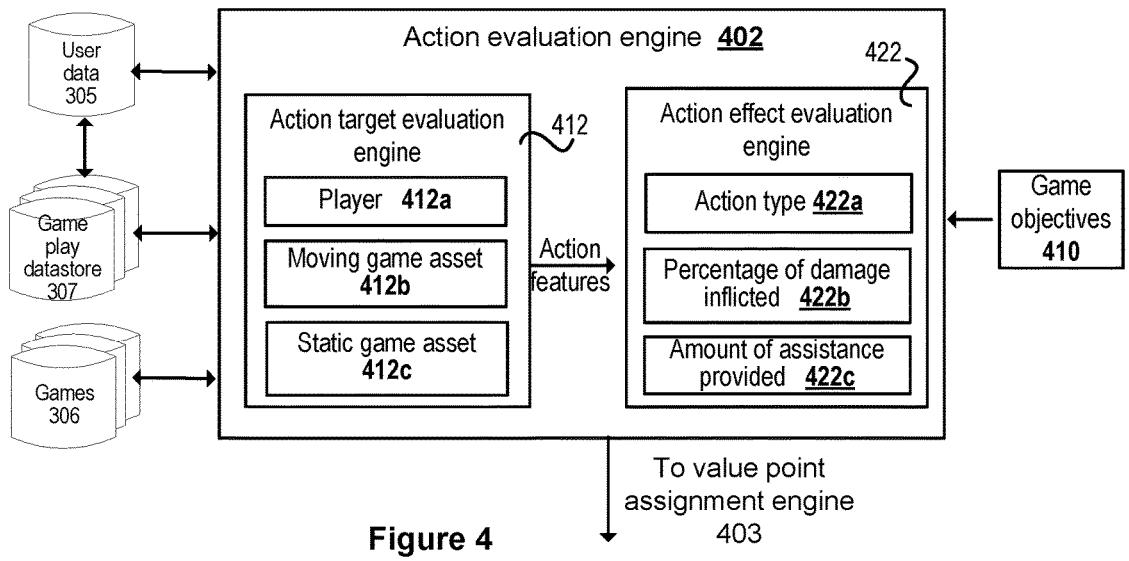
FIG. 4 illustrates a simplified block diagram of different modules within an action evaluation engine of the behavior analysis engine for evaluating the action generated from game input provided by the player during game play of the video game, in accordance with one implementation of the present disclosure.

FIG. 4 illustrates some of the modules of the action evaluation engine 402 used to evaluate the action of the player. Actions generated from game inputs of a player are directed toward a game item or a game character in a gaming scenario. Not all actions directed toward a game item are considered bad or inappropriate. The action evaluation engine 402 is used to evaluate the actions of the player to determine which actions are in accordance to the game objectives of the game and which actions are leaning toward bad or inappropriate behavior of the player. Similarly, the action evaluation engine 402 is used to determine which actions of the player are leaning toward good behavior. To assist in the evaluation, the action evaluation engine 402 includes an action target evaluation engine 412 that is configured to identify the game items and/or game characters targeted by the action of the player, and an action effect evaluation engine 422 that is configured to determine the effect of the action of the player on different game items/ game characters in the gaming scenario of the game.

The action target evaluation engine 412 is configured to identify the game items and/or game characters targeted by the action of the player. To identify the game items targeted by the player's action, the action target evaluation engine 412 initiates a query to the game play datastore 307 of the game to obtain the game play data generated for the action. The game play data is used to determine the context of the game, details of the gaming scenario including details of the game items in the gaming scenario, type of action generated by the player, game item(s) targeted by the action, game item(s) actually affected by the action, extent of effect of the action on the game item(s) affected by the action, etc. The game play data includes telemetry data that captures the details of game play of the game, including game inputs provided by the player, actions generated by interpreting the game inputs, effect of the actions and game state of the game in response to the action. The game state of the game includes status of the game items in the gaming scenario of the game. The status of the game items can be examined before and after the action was performed to identify the game items that were affected by the action and to deduce the amount of effect of the action on the game items. It is to be noted that any reference made to game items in the gaming scenario also includes game characters of other players that are interacting in the gaming scenario.

Responsive to the query, the game play datastore 307 provides the game play data that provides details of the various game items that were present in the gaming scenario at the time of the action of the player, type of game items (e.g., game character or game object, static or moving), location, size, shape, color and other features of the game items, status of the game items before and after the action, context of the gaming scenario, etc. The action target evaluation engine 412 evaluates the action of the player in the context of the gaming scenario and the type of game items the action is targeting to determine the game items that were affected by the action of the player. As previously stated, the gaming scenario may include both stationary and moving game items. The action target evaluation engine 412 uses the details provided in the game play data to track the different types of game items in the gaming scenario, monitor virtual position of each of the game items in the gaming scenario at different periods of time, and identify other game items in the vicinity of each game item at different times. In the case of a moving game item, other game items that are in the vicinity of the moving game item may vary with time, based on the position of the moving game item relative to the other game items, which may or may not be moving. Monitoring the location of each game item in relation to other game items at different times assists the action evaluation engine 402 to determine which game items are likely to get affected by the action, based on the characteristics of the action. The tracking allows for identifying attributes of, (a) game characters or game objects associated with the player and with the other players 412a, (b) moving game assets 412b, wherein the moving game asset may be a game item or a game character of another player, and (c) static game asset 412c of the game. The characteristics of the action, such as location where the action was initiated, direction of the action, speed and/or other characteristics (e.g., physics related) of action are evaluated to determine whether the action of the player affecting certain ones of the game items in the gaming environment was deliberate or accidental.

Details of the action (e.g., characteristics of the action and attributes of game items affected by the action) including the targets at which the action was directed are forwarded by the action target evaluation engine 412 to an action effect evaluation engine 422 to evaluate the amount of influence (i.e., effect) the action had on the different game items. The action effect evaluation engine 422 evaluates the action in the context of the game play of the game to determine the effects of the action on the different game items. To determine the intent of the action, the action effect evaluation engine 422 interacts with game objectives datastore 410 to obtain the game objectives and game rules of the game and weighs the action of the player and the effect of the action on different game items against the game objectives and game rules.

As stated before, the action targeting a game character or a game object (i.e., game item) in the gaming scenario may or may not affect the targeted game item(s). Instead of or in addition to the game item that the action targeted, the action may affect one or more other game items in the gaming scenario. Based on the evaluation of the action, the action may be considered to be in accordance to the game objectives when the action affects only the targeted game item(s) as defined in the game logic of the game. The action may be determined to be accidental when the action directed toward the targeted game item affects one or more of other game items that are in the vicinity of the targeted game item. The action may be determined to be inappropriate or deliberate or aggressive when the action is directed toward and affects another player's character or another game item in a manner that is not in accordance to the game objectives. The action evaluation engine 402 evaluates the attributes of the game items to determine which of the game item(s) in the gaming scenario that are moving and which ones of the game items are stationary, relative location of the game items at different times of the game play, direction of the action, in order to determine if the action affecting the game item(s) was accidental.

To better understand how to determine an effect of an action of the player on different game items and how to determine the intent of the player based on the effect of the action, the following example is provided. In this example, the gaming scenario of the game includes a game character of the player, a building located at a distance from the game character of the player, a tree in the vicinity of the building and a missile that can be launched using the game inputs. In this example, the game items are shown to be static game items, although just the moving game items or a combination of static and moving game items may also be considered. During game play, the missile is launched (i.e., action) by the player and is directed toward the building (i.e., a specific game item), which is in accordance to the game objective of the game. The action effect evaluation engine 422 evaluates the action (i.e., launched missile) to determine a type of action 422a and percentage of damage 422b inflicted on one or more game items that were targeted in the action. The action effect evaluation engine 422 may verify if the launched missile hit the building (i.e., targeted game item) or not by using the game state of the game included in the game play data. Specifically, the game state before and after the action was performed is used to determine if the building was hit. The characteristics of the action and the attributes of the game items in the gaming scenario are examined and evaluated in accordance to the game objectives to determine the type of action 422a, the type of game item(s) targeted by the action, location within the gaming scenario from where the action (missile launching) was initiated, location of the targeted game item (i.e., building) and the other game item(s) (i.e., tree) in the gaming scenario, the direction of launch of the missile, etc., to evaluate the effect of the player's action (i.e., percentage of damage inflicted 422b on different game items by the action) on the different game items in the gaming scenario.

If the launched missile hit the building, then the action effect evaluation engine 422 considers the action of the player as being appropriate as it is in accordance to the game objectives. If, however, the launched missile hits or affects the tree, the action effect evaluation engine 422 performs additional evaluation of the action of the player to determine if the player's action was accidental or intentional (i.e., deliberate). If the launched missile completely missed the building and hit the tree, which was in the vicinity of the building, the action may be considered accidental, based on the proximity of the tree to the building. Similarly, the action may be considered accidental when the launched missile hit the building and, in the process, hit the tree as well. Although the action is shown to affect a static game item (i.e., a tree), the action may affect a moving game item in a similar manner.

In one implementation, in addition to relying on the context of the current game, the action effect evaluation engine 422 may also rely on information from the prior game play sessions of the player for the game to further analyze the action and the game items affected by the action. The result from the analysis is used to determine if the current action of the player in the current game session was deliberate or accidental. For example, the action is analyzed using the information from the prior game play sessions of the game of the player to determine, (a) if the player generated the same action in the gaming scenario in the prior game play sessions, (b) if the action was directed toward the same specific game item in the past game play sessions, (c) if the current action affected the specific game item and/or the other game item(s) in a similar manner as in the past game play sessions, (d) the frequency of the action directed toward the specific game item and the other game item within the gaming scenario in the past game play sessions, (e) an amount of effect the current action had on the specific game item and the other game item(s), (f) the amount of effect the same action had on the specific game item and the other game item(s) in the prior game play sessions, etc. If the player has exhibited similar behavior in the past—i.e., targeted the same specific game item and affected the other game item in a similar manner, then the action effect evaluation engine 422 may use the information from the prior game play sessions to evaluate the amount of effect the action had on the specific game item and the other game item in the current session.

In another implementation, the action may be analyzed using information from prior game play sessions of all the games the player has played. In yet another implementation, the action may be analyzed using information from prior game play sessions of the game of a plurality of players (including the player) to determine if the action of the player in the current game play session targeting the specific game item and/or the other game item was performed by other players. The action effect evaluation engine 422 uses the action features data provided by the action target evaluation engine 412 and compares the action and the effect of the action on the different game items affected by the action against the same action performed by the player and/or other players in the gaming scenario of the game captured in the prior game play sessions. The comparison may be made in order to determine the effect of the current action on the game items affected by the current action based on what was determined in the prior game play sessions. The effect of the current action is used to flag the action as accidental or deliberate and such flagging is done based on how the action was flagged in the prior game play sessions.

Instead of adversely affecting the game items, the action, in some implementation, may be generated to provide assistance to the player to overcome a challenge, or generally progress in the game. The amount of assistance 422c provided to a game item (e.g., game character) by the action may be determined in much the same way as the amount of damage inflicted on the game item by the action by evaluating the action in accordance to the game objectives 410 of the game. The action characteristics and details of the game items targeted and/or affected by the action are provided to the assignment engine 403 for further processing. Details of the role of the assignment engine 403 will be discussed with reference to FIG. 5.

Figure 5:
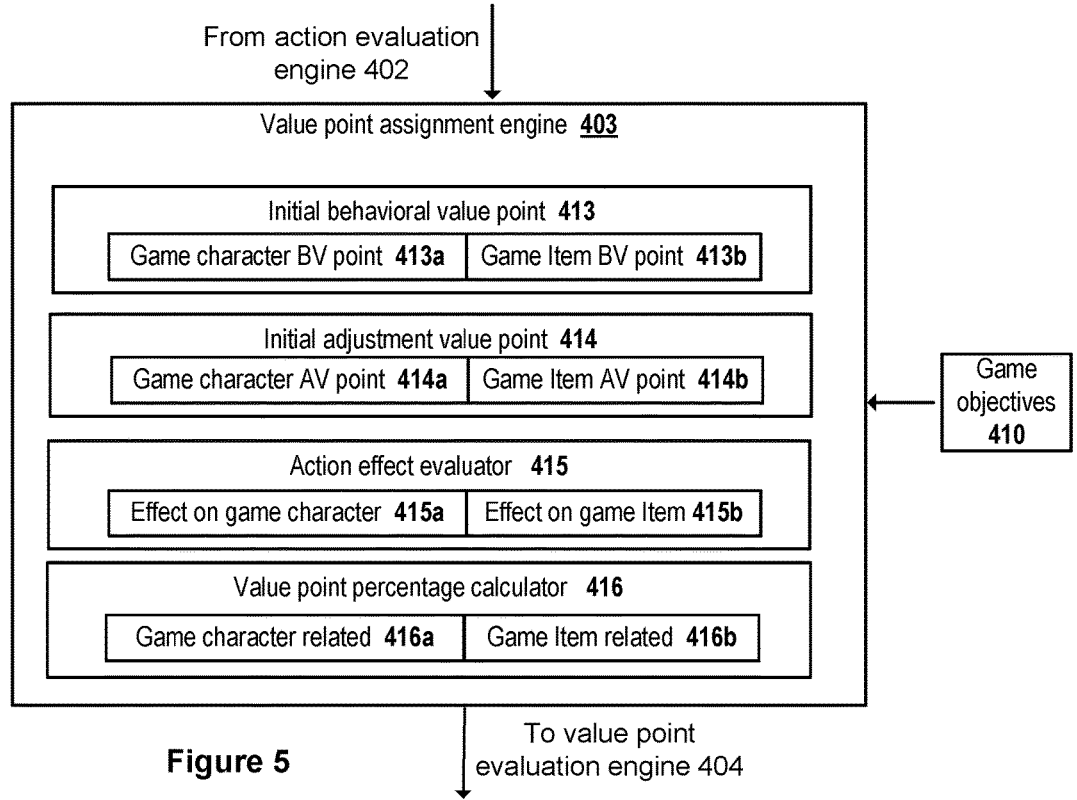
FIG. 5 illustrates a simplified block diagram of different modules within a value point assignment engine of the behavior analysis engine for evaluating the action generated from game input provided by the player during game play of the video game, in accordance with one implementation of the present disclosure.

FIG. 5 illustrates the various modules of the assignment engine 403 that are used to assign the behavioral value point and adjustment value point for the game items and for the effect of the action of a player on the game items, wherein the game items include game characters and game objects that are non-game-characters. The assignment engine 403 identifies an initial behavioral value point for the different game items in the gaming scenario. The assignment engine 403 includes a plurality of modules that are configured to identify the type of game item present in the gaming scenario and assign an initial behavioral value point and an initial adjustment value point. The initial behavioral value point may be the same for all game items or may be different depending on the type of game item in the gaming scenario. The assignment engine 403 evaluates the attributes of the game items in the gaming scenario to identify different types of game items that are present in the gaming scenario. For example, the gaming scenario may include game characters of a player and of other players, as well as game objects that are non-player game items. The assignment engine 403 identifies the different types of game items and then uses player related value assignment engine (also referred to herein as "player related value assignment") 403a to identify and assign initial behavioral value points 413a and an initial player adjustment value point 414a for each game character identified in the gaming scenario. Similarly, the assignment engine 403 identifies game objects that are non-player-game-characters within the gaming scenario and uses the item related value assignment engine (also referred to herein as "item related value assignment") 403b to identify and assign initial behavioral value point 413b and initial adjustment value point 414b for each of the game objects. As noted, the initial behavioral value points may be same or different based on the type of game objects.

The assignment engine 403 then evaluates the data shared by the action evaluation engine 402 to identify the action and the effect of action on the different game items in the gaming scenario. The assignment engine 403 may use the action effect evaluator 415 to determine the effect of action on the game characters 415a associated with other players and the effect of action on the game items 415b in the gaming scenario that were affected by the action. The action may be generated by a player targeting a game character of another player present in the gaming scene, and the action may fully or partially affect the game character or the game item, which is other than the game character. The information related to the action on the game character of another player is provided to the value point percentage calculator 416, which is configured to determine the game character related adjustment value point 416a that has to be applied to the behavioral value point related to the game character of the another player. If the effect of the action affected the game character of the another player fully and was in accordance to the game objectives, then the adjustment value point for that game character may be the base or initial behavioral value point assigned to the game character of the another player. If, however, the game character of the another player was partially affected by the action, then the adjustment value point for the game character may be a percentage of the initial adjustment value point and that percentage may be determined from the amount of effect the action had on the game character of the another player. In addition to determining the game character related adjustment value point 416a for the game character of the another player that was affected by the action of the player, the adjustment value point 416a may be determined for the player who initiated the action as a percentage of the initial adjustment value point defined for the player.

Information related to the effect of the action on the game items is provided by the action effect evaluator 415 to the value point percentage calculator 416 to determine the appropriate game item related adjustment value point 416b to apply to the different game items affected by the action of the player. The value point percentage calculator 416 evaluates the effect of the action on the different game items (i.e., game objects which are non-player-game-characters) and identifies appropriate game item related adjustment value points 416b to apply to the behavioral value points of the different game items affected by the action. If the effect of the action affected a game item fully and was in accordance to the game objectives, then the adjustment value point for that game item may be the base or initial behavioral value point assigned to the game item. If, however, the game item was partially affected by the action, then the game item related adjustment value point 416*b* may be defined as a percentage of a initial adjustment value point 414*b* that was defined for the game item, and the percentage may be based on the amount of effect the action had on the game item, and, in some implementations, may be defined based on the game objectives. The adjustment value points may be defined in accordance to the game item—i.e., a specific adjustment value point for a game character and a different adjustment value point for a non-game-character item. After the adjustment value points 416*a*, 416*b* are identified for the different game items (i.e., game characters and game objects that are non-game characters) based on the effect of the action of the player, the adjustment value points 416*a*, 416*b* and the behavioral value points 413*a*, 413*b* of the game items are provided to the point evaluation engine 404 for further processing. Details of the processing of the data by the point evaluation engine 404 will be discussed with reference to FIG. 6.

Figure 6:
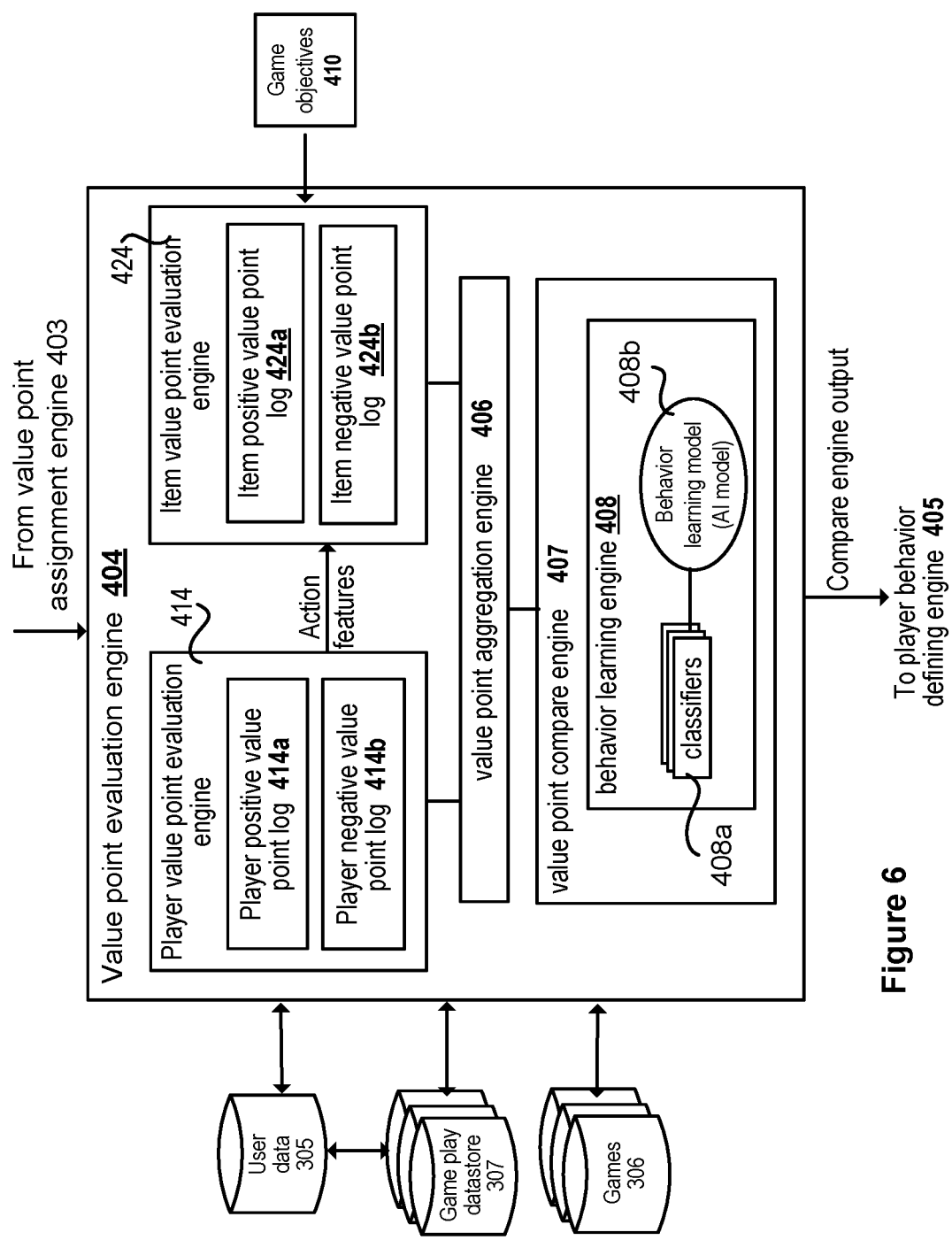
FIG. 6 illustrates a simplified block diagram of different modules within a value point evaluation engine used to evaluate the behavioral value points assigned to the player and to each game item identified in a gaming scenario of the video game, based on an action generated from game inputs of the player, in accordance with one implementation of the present disclosure.

FIG. 6 illustrates the various modules of point evaluation engine 404 that are used to quantify effect of each action of a player in the gaming scenario in order to determine the intent of the player, in one implementation. The point evaluation engine 404 applies the adjustment value points to the various game items (including game characters of the player and of other players) affected by the action of the player in the gaming scenario and adjusts the assigned value points for the different game items in accordance to the effect each action of the player has on the different game items. The adjusted value points are then evaluated to determine if the action of the player qualifies the player as good or bad.

In one implementation, the point evaluation engine 404 includes a plurality of modules and employs machine learning algorithm to assign, adjust and evaluate the value points of the game items in the gaming scenario after each action is performed. Some example modules of the point evaluation engine 404 used to assign and evaluate the value points include player value point evaluation engine 414, item value point evaluation engine 424, value point aggregation engine 406 and value point compare engine 407. The value point compare engine 407 may further include behavior learning engine 408—a machine learning algorithm, that includes classifiers 408*a* to identify and classify the various characteristics of the action and the various attributes of the game items, and use this information from the classifiers 408*a* to generate and train a behavior learning model 408*b* (an artificial intelligence (AI) model). Of course, the aforementioned modules are provided as examples and should not be considered restrictive. Fewer or additional modules may be used to evaluate the value points of the different game items to qualify the player as exhibiting good or bad behavior.

The point evaluation engine 404 receives and processes the analyzed data from the action evaluation engine 402. In some implementation, the behavioral value points and/or the adjustment value point assigned to the player, other players may be different from that assigned to the game items. In such cases, it may be better to separately process the player related data and the item related data. Consequently, the point evaluation engine 404 employs a player value point evaluation engine 414 to process the player related data, and an item value point evaluation engine 424 to process the game item related data. The player value point evaluation engine 414 is configured to identify data related to the game characters of the player and of other players in the gaming scenario that were affected by the action of the player and to keep track of the effect of the actions on the different game characters. The item value point evaluation engine 424 is similarly configured to identify data related to game items in the gaming scenario that were affected by the action of the player, wherein the other game items are non-player or non-character game items.

In one implementation, the point evaluation engine 404 begins the evaluation by examining the value points of the various game items before and after the action is performed in the gaming scenario, and evaluating the change in the behavioral value points of the different game items. The change is determined by first assigning behavioral value point for each game item in the gaming scenario of the game. The behavioral value point assigned to each game item may be based on the type of the game item. The game item includes game characters associated with the player and other players, and other game items that are non-game-characters. In one example, the behavioral value point assigned to a game character of a player may be different from the behavioral value points assigned to non-game character items. In another example, the behavioral value point assigned to the game character associated with the player initiating the action may be different from the behavioral value point assigned to game characters associated with other players present in the gaming scenario. Similarly, the behavioral value point assigned to non-player game items may be based on the type of the game items present in the gaming scenario of the game. For example, the behavioral value point assigned to a stationary game item may be different from the behavioral value point assigned to a moving game item. Alternately or additionally, the behavioral value point for a game item that is part of the story line of the game may be different from the game items that are not part of the story line. Although the aforementioned value point assignment is shown to be based on a specific attribute (i.e., type) of the game item, it should be noted that the behavioral value point may be assigned based on other attributes of the game items. In some implementations, the behavioral value point may be predefined based on the different attributes of the game item.

In addition to the initial assignment of behavioral value point to each game item, the point evaluation engine 404 may also define adjustment value point for applying to the behavioral value point of each game item when an action generated by the player in the gaming scenario affects the game item. In one implementation, the adjustment value point may be defined based on the type of action performed in the gaming scenario and the type of game item (e.g., moving game item vs. stationary game item) that is affected by the action. In another implementation, the adjustment value point may be defined to be the same for all game items and for all actions, irrespective of the type of game item and the type of actions performed in the gaming scenario. The adjustment value point is defined to reflect the amount of effect the action has on the game item.

The action directed toward a game item may or may not fully impact the game item. As a result, a plurality of adjustment value points may be defined for each game item that can be impacted by the action—e.g., one for a full impact (i.e., 100% effect) of the action on the game item, and the remaining ones as percentages of the full impact based on the amount of effect the action had on the game item. The value point system used for determining the behavior of the player will be discussed in detail with reference to the various example scenarios defined in the tables depicted in FIGS. 7A-7F.

After the behavioral value points are assigned for the different game items and adjustment value points identified for the different effects for the different actions, the amount of effect of a particular action of the player on the different game items in the gaming scenario is determined by the point evaluation engine 404 and applied to the corresponding behavioral value point of the respective game item. The application of the adjustment value point includes either incrementing or decrementing the behavioral value points of the game items by the corresponding adjustment value point identified for the effect of the action on the respective game items/game characters.

In some implementation, the player value point evaluation engine 414 is used to separately track the adjustment value point for applying to the behavioral value point of the player for the different actions generated by the player in the gaming scenario of the game, and the item value point evaluation engine 424 is used to separately track the adjustment value points for applying to the behavioral value points of the game items affected by the different actions of the player, other players. The player value point evaluation engine 414 may maintain separate logs to keep track of the positive adjustment value points and negative adjustment value points affecting the behavioral value point of the player. For instance, if the player's actions are in accordance to the game objectives and/or are constructive, then the player value point evaluation engine 414 generates an entry in the player positive value point log 414*a* to include the adjustment value point defined for the amount of effect the constructive action of the player had on game items in the gaming scenario. Alternatively, instead of providing a separate entry in the player's positive value point log, the player value point evaluation engine 414 may keep a running total of the positive adjustment value point by incrementing the positive adjustment value point maintained for the player in the player positive value point log 414*a* with the adjustment value point defined for the constructive action of the player. Similarly, if the player's actions are not in accordance to the game objectives and/or are destructive or distractive, then the player value point evaluation engine 414 generates an entry in the player negative value point log 414*b*, or alternatively, increments the negative adjustment value point maintained for the player in the player negative value point log 414*b* with the adjustment value point defined for the effect of the destructive/distractive action of the player. The number of entries in the corresponding logs maintained for the player or the number of times the adjustment value points in the respective logs are incremented may correspond with the number of actions performed by the player in the gaming scenario and/or the number of game items that are affected by the action of the player.

The item value point evaluation engine 424 is similarly configured to maintain separate logs to keep track of the positive adjustment value points and negative adjustment value points for each game item for applying to the corresponding behavioral value point of the respective game item affected by the action of the player. For instance, if a game item is affected by the player's actions in a constructive manner and/or the effect of the action is in accordance to the game objectives, then either the adjustment value point maintained in the item positive value point log 424*a* for the game item is incremented or an entry is made in the item positive value point log 424*a* for the game item using the adjustment value points identified for the amount of effect of the action of the player on the respective game item(s). Similarly, if the game item is affected by the player's actions in a destructive/distractive manner and/or the effect of the action is not in accordance to the game objectives, then either the adjustment value point maintained in the item negative value point log 424*b* for the game item is incremented or an entry is made in the item negative value point log 424*b* using adjustment value point defined for the amount of effect of the action of the player on the respective game item. The positive and the negative value point logs for each game item affected by the action may be maintained separately, or may be maintained for each action, for each player, for each game session, for each game or for all games played by the player. The details from the value point logs (414*a*, 414*b*, 424*a* and 424*b*) associated with the player and the game items are provided to the value point aggregation engine 406 for aggregation and processing.

In the implementation where separate entries are maintained in the respective value point logs, the value point aggregation engine 406 is configured to separately aggregate the entries in the respective value point logs to generate corresponding total adjustment value points (i.e., total positive adjustment value points, total negative adjustment value points) for the player and for each game item affected by the action of the player. In one implementation, the value point aggregation engine 406 may be further configured to aggregate the total value points in the positive value point logs 414*a*, 424*a*, for the player and for all the game items affected by the action of the player to generate a consolidated positive adjustment value point for the player. Likewise, a consolidated negative adjustment value point for the player is generated by aggregating the total value points in the negative value point logs 414*b*, 424*b*, for the player and for all the game items affected by the action of the player. In one implementation, the consolidated positive adjustment value point of the player is compared against a predefined threshold value to determine if the consolidated positive adjustment value point is above the predefined threshold value. If the consolidated positive adjustment value point of the player is above the predefined threshold value, then the player's action is considered to be good. On the other hand, if the consolidated positive adjustment value point of the player is below the predefined threshold value, then the player's action is considered to be appropriate or neutral. Similarly, if the consolidated negative adjustment value point of the player is greater than the predefined threshold value, then the player's action is considered to be bad. If, however, the consolidated negative adjustment value point of the player is below the predefined threshold value, then the player's action is either considered to be neutral or appropriate.

In another implementation, the value point aggregation engine 406 is used to compare the consolidated positive adjustment value point of the player against the consolidated negative adjustment value point of the player. If the consolidated positive adjustment value point of the player is greater than the player's consolidated negative adjustment value point, then the player is considered to be exhibiting good behavior through their action. On the contrary, if the player's consolidated negative adjustment value point is greater than the consolidated positive adjustment value point, then the player is considered to be exhibiting bad behavior. In this implementation, only the player's point value is considered in determining the behavior of the player and not the point values of the game items that are affected by the action of the player. In alternate implementations, additional verification of the player's behavior may be made using the consolidated positive and negative adjustment value points associated with each game item in the gaming scenario affected by the action of the player.

In one implementation, the value point aggregation engine 406 may determine if the consolidated positive adjustment value point derived for the player is greater than the consolidated negative adjustment value point for the player by at least pre-defined threshold value then the player is considered to exhibit good behavior. If, however, the consolidated negative adjustment value point is greater than the consolidated positive adjustment value point by at least the pre-defined threshold value, then the player is considered to exhibit bad behavior.

In another implementation, the point evaluation engine 404 may consider only the adjustment value points of the game items affected by the action of the player and not the adjustment value points of the player. In this implementation, the point evaluation engine 404 may first separately aggregate the positive adjustment value points and the negative adjustment value points of all the game items for each action, and then compare the aggregated positive adjustment value points against the aggregated negative adjustment value points of all the game items affected by the action of the player to determine if the aggregated positive adjustment value point is greater than the aggregated negative adjustment value point of all the game items. If the aggregated positive adjustment value point is greater than the aggregated negative adjustment value point and if the difference is above a predefined threshold value, then the player is considered to be exhibiting good behavior or behavior that is appropriate for the portion of the game included in the gaming scenario. If, on the other hand, the aggregated negative adjustment value point is greater than the aggregated positive adjustment value point and if the difference is above the predefined threshold value, then the player is considered to be exhibiting bad behavior or behavior that is inappropriate for the portion of the game included in the gaming scenario.

In alternate implementations, the positive and the negative adjustment value point of each game item may be applied to the corresponding behavioral value point to generate the adjusted behavioral value point for the respective game item. The adjusted behavioral value point of all the game items is examined to determine if the player is exhibiting good or bad behavior. Using the value point of each game item, the behavioral analysis engine 400 may be able to determine if the action of the player consistently targets a specific game item or game character of a player in each of their action in the gaming scenario. The positive and the negative adjustment value point of the player may be applied to the behavioral value point of the player to generate the adjusted behavioral value point for the player. The adjusted behavioral value point for all the game items and for the player may be stored and used for evaluating subsequent actions of the player in the gaming scenario of the current game session. In some implementations, the adjusted behavioral value point for the player may be used in other game sessions of the game, and may also be used in other games where the behavior of the player may need to be determined.

The adjusted behavioral value points of the player and of each of the game items and/or the consolidated positive and negative adjustment value points of the player and of each of the game items affected by the action of the player are provided to the value point compare engine 407. The value point compare engine 407 receives the different value points, identifies the game items that are affected by the action, attributes of the game items affected by the action of the player, characteristics of the action of the player, and defines classifiers 408a. Each classifier may include one or more attributes of the game items, and/or one or more characteristics of the actions and/or value points. Information from the classifiers 408a is used to generate a behavior learning model 408b, an artificial intelligence model, using machine learning algorithm.

The behavior learning model 408b includes a plurality of nodes with each consecutive pair of nodes connected by a link. The nodes are populated using details from the classifiers (i.e., attributes of the game items, of the players and characteristics of the actions performed by the players in the gaming scenario collected from the different game play sessions of the game). The link between the nodes defines the relationship between the nodes. As and when action related data becomes available, the behavior learning model 408b is trained by refining the nodes and strengthening the links between the pairs of nodes. In addition to the behavior learning model 408b being trained with action related data from the current game play session, the behavior learning model 408b may also be trained using action related data from the different game play sessions of the player and from game play sessions of other players that have played the game. The action related data from different game play sessions of the player, other players is provided by the player value point evaluation engine 414 and the item value point evaluation engine 424. As and when additional data from different game play sessions is received, the data in the nodes are refined, the links between the nodes are strengthened and outputs identified in accordance to game objectives of the game.

The behavior learning model is used to determine how the action of the player compares against similar action performed by other players. The data included in the behavior learning model 408b is used to identify other players that performed the same action in a similar context of the gaming scenario, compare the effect the action of the player had on the game items against the effect the same action of other players had on the game items, and the value points assigned for the game items and the player for the action against the value points assigned for the corresponding game items and the other players. An output for the action of the player is identified from the behavior learning model. The output of the behavior learning model 408b is provided to the behavior defining engine 405.

The player behavior defining engine 405 uses the output from the behavior learning model 408b to label or tag the player as exhibiting good behavior, bad behavior or is playing as expected, and such labeling/tagging is done based on evaluation of the adjusted behavioral value points of the player, of the game items affected from the action of the player in the gaming scenario, and comparing the corresponding value points against that of other players that performed the same action. Further, the details provided in the output of the behavior learning model 408b for the action allow the player behavior defining engine 405 to determine if the player has been consistently having a tendency toward certain game items (e.g., game character of another player) in the game. The tendency of the player toward certain game items can be determined from the data collected from prior game play sessions of the game and of other games (i.e., game items affected by the action of the player). Based on the tendency of the player toward certain game items, the behavior analysis engine 400 may be able to gear up or down the penalties/incentives awarded to the player. For instance, if the player is consistently known to target a certain game item (e.g., game character of another player), based on their past history in the game or in other games, the behavior analysis engine 400 may be quick to identify such behavior of the player and flag that player as a good or bad player faster than other players.

In some cases, the player may exhibit bad behavior in one game but exhibit good behavior in other games. Alternately, the player may exhibit bad behavior toward a specific player's game character but exhibit good behavior with the game characters of other players within the game. Similarly, the player may exhibit good behavior toward a specific player's game character while interacting with other game items as expected (i.e., exhibiting typical player characteristics) during game play of the game. The output from the behavior learning model 408*b* can be used to quickly identify such differential behavior of the player. The behavior analysis engine 400 may be able to provide the player exhibiting such differential behavior with incentives in recognition of their good behavior or warning to fix their bad behavior (if any) sooner rather than later in the game.

In some instances, the behavior analysis engine 400 may give a benefit of doubt to the player by not flagging certain action of the player as bad. This may be the case where the player's action adversely targeting a specific game item was occasional or infrequent. The occasional or infrequent occurrence of such actions may be deduced from the details provided in the output of the behavior learning model 408*b*. If, however, the behavior analysis engine 400 sees a pattern of the specific game item being targeted by the player, the behavior analysis engine may detect such pattern and send out a signal to warn or notify the player to correct their behavior. The output data from the behavior learning model 408*b* provides sufficient information to enable the behavior analysis engine 400 to determine when to flag the player, when to restrict the player's access to certain portions of the game, when to provide warning, and when to provide accolades/incentives. The notification or warning can be provided in different ways including penalizing the player, audio or haptic warnings, verbal or textual warnings, limiting access to the game, etc.

The behavior analysis engine 400 may also recognize the player's good behavior faster by analyzing the player's past history in the game, in other games, and/or from current game play session. A player who had previously exhibited bad behavior may have changed their behavior in the current game play session. By recognizing the good behavior of the player in the current game session sooner than later, the behavior analysis engine 400 can award incentives or anonymous accolades to the player faster. Such incentives are provide to encourage the player to continue exhibiting good behavior so that all the players of the multi-player game can have satisfying game play experience.

The behavior analysis engine 400 may match certain attributes of the player with corresponding attributes of other players to identify other players that have played the game, and utilize the metrics of the identified other players in training the behavior learning model 408*b*, so as to assist in determining what is considered good behavior or bad behavior. Using the trained data and the metrics of the player, the behavior analysis engine 400 can modify the degree at which the behavioral value points can be adjusted for the player. For instance, if the player has been known to exhibit good behavior, the behavioral value point of the player may be incremented by a multiple of the adjustment value point identified for the player. Similarly, if the player has been known to exhibit bad behavior, the behavioral value point of the player may be decremented by a multiple of the adjustment value point identified for the player. The degree of adjustment assists in concluding when the player has reached or exceeded the threshold of good points or bad points to declare them as good or bad players. The behavior analysis engine 400 evaluates the action of the player in the background independent of the game scoring system. The labeling of the player as good or bad using the point value system is done independent of input from other players, which may or may not be biased or immature or consistent.

In some implementations, the behavior analysis engine 400 may use the input from other players in addition to the value point system to label the player based on their actions in the game. In this implementation, the input from other players may influence the degree of adjustment to the positive or negative adjustment value points applied to the behavior value point of the player. In some implementations, the behavior analysis engine 400 may only consider the player's own value points hitting the predefined threshold point. In other implementations, the behavior analysis engine 400 may not only consider the player's own value points hitting the predefined threshold point but also the value points of the game items hitting the predefined threshold point. For example, in the case of the gaming scenario having the tree, monster, and game character of the player, when the tree was significantly affected by the missile launched by the player, the adjustment value point accorded to the tree can be used to determine if the player's action constituted bad behavior. The behavior analysis engine 400 can thus use multiple metrics to measure the player's good or bad behavior, where in the multiple metrics provide ways to check when the player crosses the threshold from good to bad behavior or vice versa. Relying on multiple metrics makes this behavioral value system more robust and labeling of the player more consistent (i.e., reliable) than relying on just inputs from other players.

The multiple metrics used to determine the behavior of the player, may be identified using time stamp of the action performed by the player in the gaming scenario. The time stamp may be used to synchronize the action to changes occurring in the gaming scenario of the game. The synchronization correlates the action to the changes caused by the action so as to align the different metrics occurring in the game to the action of the player in the gaming scenario. The behavioral analysis engine uses the correlation to identify the various metrics, assign and adjust the value points to these metrics based on the effect of the action, and use the value points to determine the behavior of the player.

FIGS. 7A-7F illustrate some example value point assignments/adjustments for game items and the player in a gaming scenario based on effect of a certain action of the player on the different game items in the gaming scenario, in some example implementations. The examples illustrated in FIGS. 7A-7F are intentionally kept simple to provide an understanding of the various effects that can be inflicted by an action of a player on different game items within the gaming scenario and the assignment/adjustment of the value points of the different game items in response to the effect of the action. In reality, the gaming scenario may include a plurality of game items and different action(s) may be performed by the player in addition to or in place of the action noted in the examples. Further, the action of the player may affect more than one game item. After each action or after a level of game play or after game session, the value points of the different game items and of the player can be examined and evaluated incrementally to understand the intentions of the player and to deduce the player's behavior in the game.

The various examples of FIGS. 7A-7F depict a simplified gaming scenario, which includes a game character representing the player, a monster that is moving around in the gaming scenario (i.e., a moving target), and a tree (i.e., a stationary game item). In reality, the gaming scenario may include a plurality of game items, wherein the plurality of game items may or may not include one or more game characters of other players. The objective of the game is to hit the monster (e.g., by launching a tool/missile). The point evaluation engine 404 assigns behavioral value point to each of the game items present in the gaming scenario. In the examples depicted in FIGS. 7A-7F, the behavioral value points are assigned to the game character of the player, the monster and the tree. Further, for simplicity sake, the behavioral value points assigned to each of the game items in the gaming scenario is defined to be the same—e.g., 100 points. But, as previously noted, the behavioral value point assigned to different game items may be based on the attributes of the game items and may be different.

Additionally, adjustment value points are defined for the player and for each of the game items in the gaming scenario affected by the action of the player to represent the amount of effect the action had on the respective game item. For example, when the effect of the action of the player on a game item completely destroys or fully influences the game item (i.e., amount of effect of the action on the game item is 100%) and such effect of the action is in accordance to the game objectives of the game, then the adjustment value point may be defined to be equal to the initial behavioral value point (e.g., 100 points—from the above example). Alternately, when such effect of action on the game item is not in accordance to the game objectives of the game or when the game item is affected partially by the action, then the adjustment value point for the game item may be defined to be a percentage of an initial adjustment value point defined for the game item. In one example, the adjustment value point for each of the game items in the gaming scenario may be pre-defined to be 50 points for a full impact of the action on the respective game item. When the game item is partially affected by the action, the adjustment value point for the game item is defined to be a percentage of the 50 points, wherein the percentage corresponds to the amount of effect the action had on the game item. Thus, the adjustment value points for the different game items may be determined dynamically by evaluating the effect of the action on the respective game items.

In addition to defining adjustment value points for the game items, an initial adjustment value point may be defined for the player for an action initiated by the player in the gaming scenario. The initial adjustment value point may correspond to the action targeting a game item that is in accordance to game objectives. When the targeted game item is partially affected by the action of the player or when another game item is affected by the action instead of or in addition to the targeted game item, the adjustment value point for the targeted game item and for the other game item may be defined to be a percentage of the initial adjustment value point. Further, the adjustment value point defined for the player may be different for different actions and may depend on the type of action generated by the player. For simplicity sake, the initial adjustment value point for the player, in one implementation, may be defined to be the same for each action generated by the player—e.g., 50 points, irrespective of whether the action is in accordance or not in accordance to the game objectives of the game.

FIG. 7A illustrates an example gaming scenario wherein a missile was launched by the player via game inputs and this action completely destroyed the monster and did not affect the tree (i.e., any other game item in the vicinity of the monster or in the path of the missile). Destroying the monster may have been in accordance to the game objectives of the game. As a result, the adjustment value point for the player is defined to be the initial adjustment value point of 50 points, since the player's action was in accordance to the game objective of the game. Consequently, responsive to the action of the player, the player's behavioral value point (100 points) was incremented by the adjustment value point (50 points) for a total behavioral value point of 150 points. Additionally, since the action fully destroyed the monster, which was in accordance to the game objective, the adjustment value point for the monster was equal to the initial behavioral value point of 100 points. Consequently, the monster's behavioral value point (100 points) was decremented by the adjustment value point (100 points) for a total behavioral value point of zero. Since the only other game item (i.e., tree) in the gaming scenario was unaffected by the action of the player, the adjustment value point for the tree was zero (since there was no impact of the action on the tree) and the behavioral value point of the tree remained unchanged at 100 points. The game point of the player for the action was incremented from 0 to 200 (200 points awarded for hitting the monster), in accordance to the game scoring logic defined for the action in the game logic.

FIG. 7B illustrates another example where the action of the player fully destroyed the monster but also partially damaged the tree in the vicinity of the monster. In this example, the tree may have been damaged as the monster was moving about in the gaming scenario and came proximal to the tree when the missile was launched by the player. Since the player's action resulted in the destruction of the monster, which was in accordance to the game objectives, the player's behavioral value point is incremented by 50 points (adjustment value point defined for the action for the player) for a total behavioral value point of 150 points for the player. As in the example illustrated in FIG. 7A, since monster got completely destroyed, the total behavioral value point for the monster is zero. Further, since the tree got partially damaged, and this damage was not in accordance with the game objectives, the behavioral value point of the tree was decremented by a percentage (e.g., 50%) of the initial adjustment value point of 50 points (i.e., initial adjustment value point defined for the game item—tree), as the tree was partially destroyed. The total behavioral value point for tree, after applying the adjustment value point of 25, was equal to 75 points (100−25 points). The game point of the player for the action was incremented from 0 to 220 (200 points awarded for hitting the monster and 20 points awarded for hitting the tree), in accordance to the game scoring logic defined for the action in the game logic.

FIG. 7C illustrates yet another example where the game inputs of the player resulted in two actions being generated, one after another, and resulted in the monster being completely destroyed. The first action damaged the tree by about 50% (e.g., damaged some limbs) and the second action resulted in additional damage of 20% for a total damage of the tree by about 70%. As in the example illustrated in FIG. 7B, since the monster was completely destroyed and was in accordance to the game objectives, the total behavioral value point for the monster is zero. The player's total behavioral value point was incremented by 50 points for the destruction of the monster. In this example, since the second action of the player destroyed the tree by 70 percent, and such action was not in accordance to the game objective, the player may be penalized by 10 points, for a total behavioral value point for the player of 140 (100+50−10). Since the tree sustained considerable damage, the adjustment value point for the tree was 60 points and the total behavioral value point for the tree is 40 points (100–60). The game point of the player for the action in this example was incremented from 0 to 240 (200 points awarded for hitting the monster and 40 points for hitting the tree twice (20 points for each hit)), in accordance to the game scoring logic defined for the action in the game logic. The adjustment in the game point is independent of and does not correlate with the behavioral value point for the player and the game items. For instance, the game point for the player may keep incrementing while the behavioral value point of the player may fluctuate up or down depending on the action and the effect of the action on the different game items.

FIG. 7D illustrates one more example, wherein only the tree was hit by the action of the player and the monster was not affected. This may be the case when the monster moved away from the path of the missile just in time. In this example, since hitting of the tree was not in accordance to the game objective of the game and the tree suffered substantial damage, the adjustment value point for the player is defined to be 70 points—initial adjustment value point of 50, and an additional 20 points for substantially damaging the tree (i.e., more than 50%). The total behavioral value point for the player is computed to be 30, after the initial behavioral value point (100 points) for the player is decremented by the adjustment value point (70 points). The behavioral value point was decremented as the action of the player affected the tree (i.e., a game item that was not the targeted game item) that was not in accordance with the game objectives of the game. Similarly, the same adjustment value point may be applied to the initial behavioral value point for the tree for a total behavioral value point of 30. The action of the player may have been accidental, as the player may have been aiming at the monster that was moving in the gaming scenario and, in the process, hit the tree instead of the monster. In order for the behavior analysis engine to correctly gauge the true intention of the player, the behavioral value points of the player and of the tree are adjusted in accordance to the effect of the action. The adjusted behavioral value point of the player and of the tree is evaluated in the context of the gaming scenario to determine if the action is accidental or intentional. In this case, it may be determined that the player's action was accidental due to the moving monster and its proximity to the tree when the missile was launched.

In order for the value point system to ascertain the true intentions of the player (i.e., the action of the player is intentional or accidental), the value point system performs the computation of the total behavioral value points for each game item and for the player by identifying and applying the appropriate adjustment value points that are representative of the effect of the action on the game items. The total behavioral value points of the player and of the game items are determined for each action of the player, which are then evaluated to determine if the player is exhibiting good or bad behavior. In the example illustrated in FIG. 7D, the total behavioral value point for the monster remains unchanged at 100 points, as the monster was not affected by the action of the player.

The game point of the player for the action in this example was incremented from 0 to 70 points for hitting and damaging the tree substantially, in accordance to the game scoring logic defined for the action in the game logic. As in the previous example, the adjustment in the game point is independent of and does not correlate with the behavioral value point for the player and the game items. The game point is computed based on changes that are occurring to game items that are according to the game logic, and the changes that are not according to the game logic are ignored. For instance, the game point for the player may keep incrementing while the behavioral value point of the player may fluctuate up or down depending on the action and the effect of the action on each and every game item in the gaming scenario.

FIG. 7E illustrates one more example of applying the adjustment value point to the behavioral value points of the player and of the game items affected by the action of the player. In this example, the action of the player partially damages the monster and substantially damages the tree. In this example, the adjustment value point for the player includes +25 points for partially damaging the monster, which was in accordance to the game objectives, and –35 points for substantially damaging the tree, which was not in accordance to the game objectives. The adjustment value points for the player, in this example, is defined to be a percentage of the initial adjustment value point (50 points) defined for the player, wherein the percentage is determined in accordance to the amount of damage caused by the player's actions on the different game items in the gaming scenario. The incrementing or decrementing may be determined by evaluating the amount of effect of the action on the different game items and by determining if the effect on each game item was in accordance to the game objectives or not. Accordingly, the total behavioral value point of the player is equal to 90 (i.e., 100+25–35). Similarly, the adjustment value point for the monster is determined to be a percentage of 50 points (e.g., about 30-about 60 percent of the initial adjustment value point identified for the monster based on the amount of damage incurred by the monster, as it is in accordance to the game objectives), and for the tree to be 70 points, as there was substantial damage to the tree and the effect of the action was not in accordance to the game objectives. Consequently, the total behavioral value point for the monster is 70 (i.e., 100–30), and for the tree it is 30 (i.e., 100–70). The game points of the player was incremented from 0 to 270 (200 points awarded for hitting the monster and 70 points awarded for hitting the tree), in accordance to the game objectives of the video game.

It is to be noted that the assignment of the behavioral value points for the player, other players and game items and identification of the adjustment value points for applying to the respective behavioral value points by the point evaluation engine 404 is different from and is in addition to the game point system performed by the game logic. The game point system is used to define the game state and game standing of the player in the multi-player game, whereas the value point system is used to determine the behavior of the player in the game. The game point system keeps a running tab of the game points, game tools gained/lost by the player, game level of the game the player is playing in, etc., and the behavioral value system keeps tab of the behavior of the player by evaluating each action of the player in the game.

Although the examples illustrated in FIGS. 7A-7E was provided to illustrate the adverse effect of an action of the player on the game items in the gaming scenario, it is to be noted that not all actions generated by the player adversely affect one or more game items in the gaming scenario. Some of the actions may be performed by the player within the gaming scenario to influence the game play in a constructive way. For example, the player may assist another player by defending the player against an enemy or assist the player in achieving a goal in the game or by performing actions that are collaborative in nature. Such actions are also evaluated in a manner similar to the evaluation of actions that adversely affect the game items, adjustment value points identified, and behavioral value points are adjusted for the player and the game items affected by the constructive action. It is important to take both the constructive actions as well as the destructive/distractive actions into consideration in order to properly evaluate the behavior of the player. Thus, after each action (i.e., constructive or destructive) is completed in the gaming scenario, appropriate adjustment value point for each game item/game character is selected, based on the amount of positive or negative effect the action had on each game item/game character. The adjustment value point of each game item is used for adjusting the behavioral value point of the respective game item and the player, wherein the adjusting can result in incrementing or decrementing the behavioral value point of the respective game item and of the player. The resulting total behavioral value point of each game item and of the player are examined to properly flag the action of the player as good or bad. It is indeed not sufficient to rely on one action of the player to determine the behavior of the player. Thus, as the player continues to perform actions in the game, the behavioral value points of the game items and of the player are continually adjusted and evaluated, so that the overall effect of the different actions on each game item can be used to properly to deduce the behavior of the player.

In one implementation, the way player 1 plays their game and gains/loses their behavioral points is independent of the way player 2 plays their game and gains/loses their behavioral points. In one implementation, player 1 and player 2 may be collaborators providing game inputs to help achieve the goal (i.e., game objectives) of the game. In this implementation, the gains/losses incurred during the game play may be split evenly or in accordance to amount of action generated by the respective player in achieving the common goal. If, in the process, either player 1 or player 2 damages/adversely affects the other player's game character while trying to meet the game objectives, then the actions of that player, depending on the extent of the damage inflicted on the other player's game character, may be flagged unintentional or accidental. In another implementation, player 1 and player 2 may be adversaries. In this case, either player 1 or player 2 may prevent the other player from meeting the game objectives. In such case, the player that prevents the other player from progressing may be penalized or flagged for bad behavior. Thus, the various metrics of game play of each player, the game objectives of the game, and the game context of the game are all taken into consideration by the behavior analysis engine to flag or tag a player as good or bad.

FIG. 7F illustrates an example of an effect of a non-action of a player on the behavioral value points of the game items in the gaming scenario. The player may hide behind the tree or behind a building or inside a basement of a building or under water inside a lake. The action evaluation engine 402 will detect the non-action of the player and provide the input to the point evaluation engine 404. In this example, no game item was affected by the non-action of the player. However, the point evaluation engine 404 may identify a pre-defined adjustment value point for applying to the behavioral value point of the player. The adjustment value point for the non-action may be nominal or substantial depending on the context of the gaming scenario and the amount of time the player was staying idle. The pre-defined adjustment value point is applied to the behavioral value point of the player to generate the total behavioral value point for the player. Since none of the game items were affected, the behavioral value points of the game items were not affected. Further, the game points for the game computed by the game scoring logic, remained unaffected at zero due to the non-action of the player.

The various examples illustrated in FIGS. 7A-7F are provided to give an understanding of how the action or non-action of the player can be quantified based on the amount of effect the action on the different game items. The change in the behavioral value points of the game items is analyzed to establish the action of the player as being good or bad. The behavioral value points, thus assigned and adjusted for the player and the game items provide a better way for determining the behavior of the player rather than relying on just the inputs of other players, which may be biased or immature. Properly identifying the behavior of the player may result in the player as well as the other players in having a better game play experience. For instance, tagging the player as bad just by relying on input from one or more other players may result in the player being unnecessarily tagged for action that may have been accidental or unintentional. The incorrect tagging may result in the player being unnecessarily penalized (e.g., forced to have limited access to the game or forced to forego certain privileges or tools or points, etc.) or provided with warnings that are not warranted. The player may not even be aware that their action is considered to be bad. The value point system assists in allaying such issues by using the value points to correctly tag the player, continually monitoring the behavior of the player, and providing informative messages or notifications to inform the player of the specific action that caused the generation of such warning. Further, correctly tagging the player and using the behavior metrics identified by the point value system discussed herein to quickly identify the true intent of the player can assist in reducing online bullying, which can cause unnecessary hardship on other players that are targeted by the player. By identifying online bullies, the system can provide sufficient checks and measures to prevent digital bullying, and when the player does not fix their behavior can restrict access to the game so that other players can have satisfying game play experience. Similarly, the system can also identify good players who play by the rules of the game and assist other players so as to incentivize them to continue their good behavior, thereby ensuring that all players have good game play experience.

Figure 8:
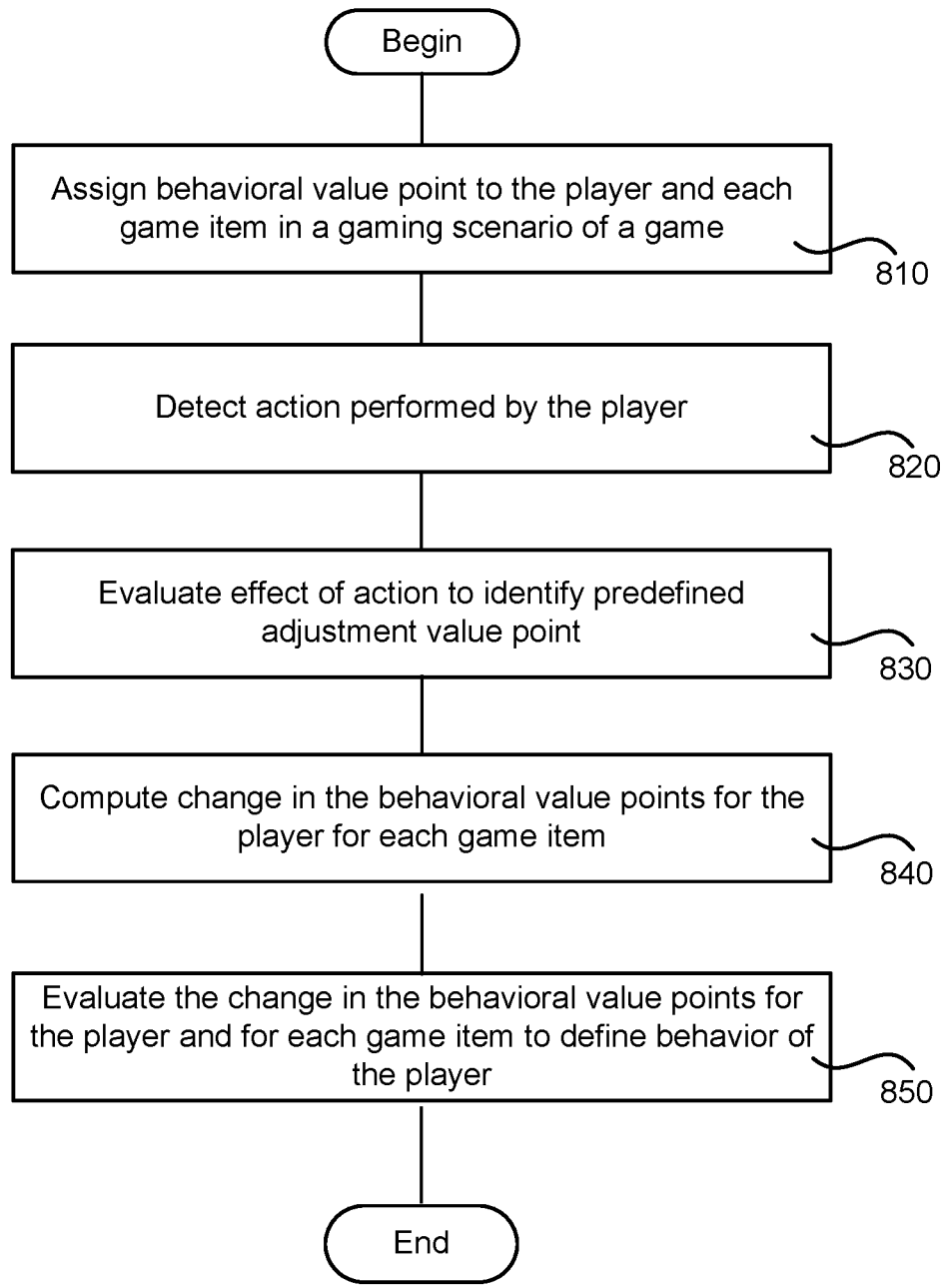
FIG. 8 illustrates a flow diagram of various operations of a method used in evaluating behavior of a user during game play of a video game, in accordance with one implementation of the present disclosure.

FIG. 8 illustrates flow of operations of a method for determining behavior of a player in a game, in one implementation. The method begins at operation 810, wherein behavioral value point is assigned to a player playing the game and to each game item that is available within a gaming scenario of the game. The game is a multi-player game and the player accesses a gaming scenario to provide game inputs that affect a game state of the game. The gaming scenario includes a plurality of game items (i.e., game objects and game characters of other players that are also playing the game). The behavioral value points assigned to the player may be different from that assigned to each game item. Further, each game item may be assigned different behavioral value point, based on the type and other attributes of the game item. In addition to behavioral value points, behavior analysis engine 400 is configured to identify adjustment value points for applying to the behavioral value points of the different game items and the player. The adjustment value points are identified to correspond with amount of effect an action of the player has on the different game items.

The behavioral analysis engine 400 detects an action performed by the player in the gaming scenario, as illustrated in operation 820. The action initiated by the player is a result of the game inputs provided by the player during game play. The action is directed toward one or more game items in the gaming scenario. The effect of the action on the different game items is evaluated, as illustrated in operation 830. The effect of the action may be determined by evaluating change in the game items affected by the action. The time stamp of the action may be used to correlate the action to the changes in the game items in the gaming scenario in order to identify the game items affected by the action. The amount of change may be determined by evaluating the state of the game item before and after the occurrence of the action.

The amount of effect the action has on each game item may be used to identify adjustment value point that has to be applied to the behavioral value point of each of the player and of the game item affected by the action of the player. The adjustment value point for applying to the player's behavioral value point may be predefined for the action generated by the player. The adjustment value point for applying to the player's behavioral value point may be different for different types of actions initiated by the player or may be the same for all types of actions. The adjustment value point for each game item may be identified based on the amount of effect the action of the player had on the game item. In some implementation, an initial adjustment value point may be defined for the game item affected by an action of the player and the adjustment value point that is actually applied to a game item may be a percentage of the initial adjustment value point, based on the amount of effect the action had on the game item. In alternate implementations, the adjustment value point for the game item may be defined using other logic. The amount of effect the action has on each game item in the gaming scenario is evaluated and the appropriate adjustment value point is identified, as illustrated in operation 830.

Once the behavioral value points for the player and the game items are assigned and the adjustment value points are identified for each game item affected by the action, the change in the behavioral value point is computed by applying the adjustment value point identified for the player and for each game item affected by the action of the player to the corresponding behavioral value point, as illustrated in operation 840. The behavioral value point for the player and for each game item affected by the action of the player may be incremented or decremented by the corresponding adjustment value point identified for the player and each game item. Incrementing or decrementing is determined based on whether the effect of the action was in accordance to the game objectives of the game. The change in the behavioral value point of the player and of the game items in the gaming scenario are evaluated to determine if the action of the player leaned toward good or bad, as illustrated in operation 850. The player is tagged based on the evaluation and the tag is updated to the user profile of the player. The behavioral tag of the player may be used to either incentivize or penalize/warn the player to adjust their behavior so that all the players playing the game can have good and satisfying game play experience.

The value point system followed by the behavior analysis engine 400 helps in accurately tagging the behavior of the player. The value point system is performed in the background by the behavior analysis engine 400 independent of the game scoring system performed by the game logic. The game scoring system tracks the status of the player in the game while the value point system keeps track of the behavior of the player in the game. The behavior of the player may be good or bad and the tagging allows the player's behavior to be determined quickly and independently of other player's inputs, which may be biased or, in some cases, immature. In some cases, the other player's inputs may be used to further authenticate the player's behavior determined using the value point system.

Figure 9:
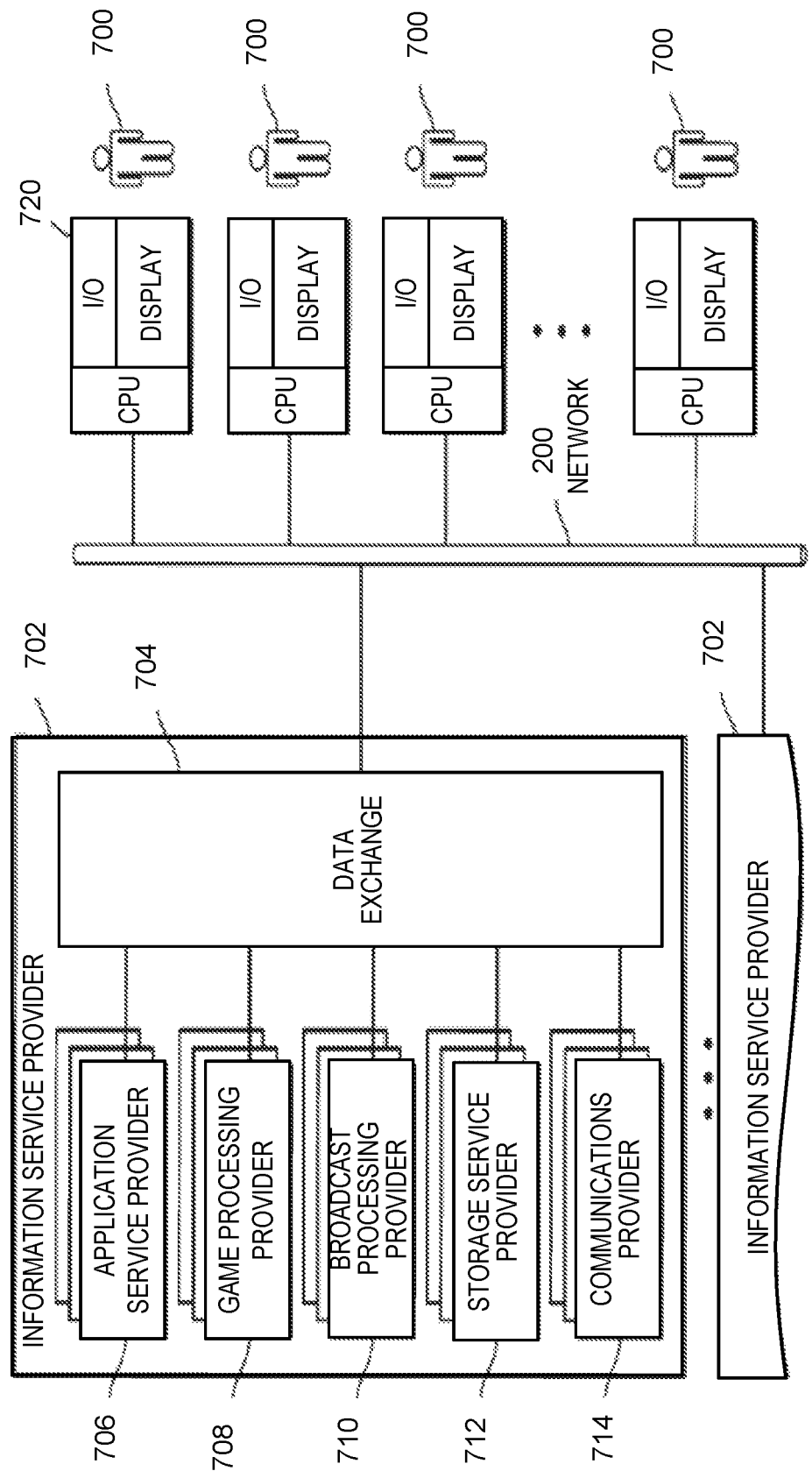
FIG. 9 illustrates an example implementation of an Information Service Provider architecture, in accordance with one implementation of the present disclosure.

FIG. 9 illustrates an embodiment of an Information Service Provider architecture. Information Service Providers (ISP) 702 delivers a multitude of information services to users (i.e., players) 700 geographically dispersed and connected via network 200. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 702 includes Application Service Provider (ASP) 706, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 702 includes a Game Processing Server (GPS) 708 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 710 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 712 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 714 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 704 interconnects the several modules inside ISP 702 and connects these modules to users 700 via network 200. Data Exchange 704 can cover a small area where all the modules of ISP 702 are in close proximity, or can cover a large geographic area when the different modules are geographically dispersed. For example, Data Exchange 704 can include a fast Gigabit Ethernet (or faster) within a cabinet of a data center, or an intercontinental virtual area network (VLAN).

Users 700 access the remote services with client device 720 (i.e., client device 100 in FIG. 1), which includes at least a CPU, a memory, a display and I/O. The client device can be a PC, a mobile phone, a netbook, tablet, gaming system, a PDA, etc. In one embodiment, ISP 702 recognizes the type of device used by the client and adjusts the communication method employed. In other cases, client devices use a standard communications method, such as html, to access ISP 702.

Figure 10:
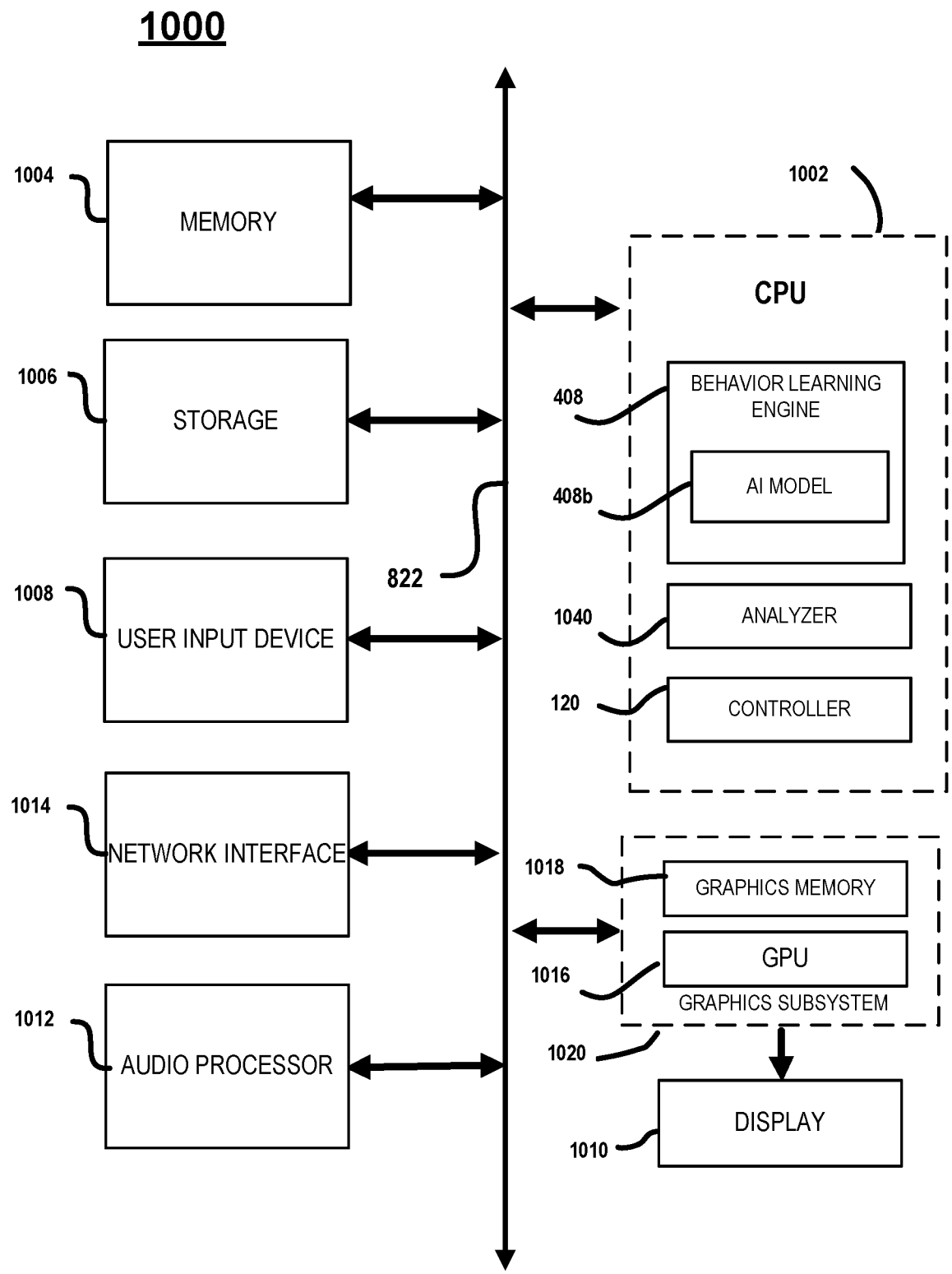
FIG. 10 illustrates a simplified block diagram of a game cloud server used for determining behavior of each player in a video game, in accordance with one implementation of the present disclosure.

FIG. 10 illustrates components of an example device 1000 that can be used to perform aspects of the various embodiments of the present disclosure. This block diagram illustrates a device 1000 that can incorporate or can be a personal computer, video game console, personal digital assistant, a server 302 or other digital device, suitable for practicing an embodiment of the disclosure. FIG. 10 illustrates an exemplary device with hardware components suitable for training an AI model that is capable of performing various functionalities in relation to a video game and/or game plays of the video game, in accordance with one embodiment of the present disclosure. Device 1000 includes a central processing unit (CPU) 1002 for running software applications and optionally an operating system. CPU 1002 may be comprised of one or more homogeneous or heterogeneous processing cores. For example, CPU 1002 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, implementing and rendering the contextually relevant resources in a video game immediately, media and interactive entertainment applications, applications configured for deep learning, content classification, and user classifications. For example, CPU 1002 may be configured to include the behavior learning engine 408, which is a machine learning algorithm (also referred to herein as AI engine or deep learning engine) that is configured to support and/or perform learning operations with regards to providing various functionalities (e.g., predicting, suggesting) in relation to a video game and/or game plays of the video game. Further, the CPU 1002 includes an analyzer 1040 that is configured for analyzing the inputs and interactions and providing the results of the analysis for generating and training the behavior learning model (AI model) 408b. The trained behavior learning model 408b provides an output in response to a particular set of players' inputs, wherein the output is dependent on the predefined functionality of the trained behavior learning model 408b. The trained behavior learning model 408b may be used to identify the behavior of a player based on their actions and to dynamically notify the player to correct their behavior, during game play. The notification may be to guide the player toward a interactive task or provide feedback in regards to a move or action the player has to make or is making in the game.

Device 1000 may be localized to a player playing a game segment (e.g., game console), or remote from the player (e.g., back-end server processor), or one of many servers using virtualization in a game cloud system for remote streaming of gameplay to client devices (or simply referred to as "clients").

Memory 1004 stores applications and data for use by the CPU 1002. Storage 1006 provides non-volatile storage and other computer readable media for applications and data and may include fixed disk drives, removable disk drives, flash memory devices, and CD-ROM, DVD-ROM, Blu-ray, HD- DVD, or other optical storage devices, as well as signal transmission and storage media. User input devices 1008 communicate user inputs from one or more users to device 1000, examples of which may include keyboards, mice, joysticks, touch pads, touch screens, hand-held controllers, wearable controllers, still or video recorders/cameras, tracking devices for recognizing gestures, and/or microphones. Network interface 1014 allows device 1000 to communicate with other computer systems via an electronic communications network, and may include wired or wireless communication over local area networks and wide area networks such as the internet. An audio processor 1012 is adapted to generate analog or digital audio output from instructions and/or data provided by the CPU 1002, memory 1004, and/or storage 1006. The components of device 1000, including CPU 1002, memory 1004, data storage 1006, user input devices 1008, network interface 1014, and audio processor 1012 are connected via one or more data buses 1022.

A graphics subsystem 1020 is further connected with data bus 1022 and the components of the device 1000. The graphics subsystem 1020 includes a graphics processing unit (GPU) 1016 and graphics memory 1018. Graphics memory 1018 includes a display memory (e.g., a frame buffer) used for storing pixel data for each pixel of an output image. Graphics memory 1018 can be integrated in the same device as GPU 1016, connected as a separate device with GPU 1016, and/or implemented within memory 1004. Pixel data can be provided to graphics memory 1018 directly from the CPU 1002. Alternatively, CPU 1002 provides the GPU 1016 with data and/or instructions defining the desired output images, from which the GPU 1016 generates the pixel data of one or more output images. The data and/or instructions defining the desired output images can be stored in memory 1004 and/or graphics memory 1018. In an embodiment, the GPU 1016 includes 3D rendering capabilities for generating pixel data for output images from instructions and data defining the geometry, lighting, shading, texturing, motion, and/or camera parameters for a scene. The GPU 1016 can further include one or more programmable execution units capable of executing shader programs.

The graphics subsystem 1020 periodically outputs pixel data for an image from graphics memory 1018 to be displayed on display device 1010. Display device 1010 can be any device capable of displaying visual information in response to a signal from the device 1000, including CRT, LCD, plasma, and OLED displays. Device 1000 can provide the display device 1010 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure of the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server 302 may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of PEs, each of which may reside on different server units of a data center.

According to this embodiment, the respective PEs for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a PE associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, a mobile device, etc. In one embodiment, the network executing on the game server recognizes the type of client device used by a user and adjusts the communication method employed. In other cases, client devices use a standard communications method, such as html, to access the application on the game server over the internet.

It should be appreciated that a given video game or gaming application may be developed for a specific platform and a specific associated controller device (or simply referred to as "controller") 120. However, when such a game is made available via a game cloud system as presented herein, the user (e.g., player) may be accessing the video game with a different controller 120. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller 120 (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller 120 are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller 120. That is, the controller 120 communicates via a wireless or wired connection with the client device to transmit inputs from the controller 120 to the client device. The client device may in turn process these inputs and then transmit input data to the game cloud server via a network (e.g. accessed via a local networking device such as a router). However, in other embodiments, the controller can itself be a networked device, with the ability to communicate inputs directly via the network to the game cloud server, without being required to communicate such inputs through the client device first. For example, the controller might connect to a local networking device (such as the aforementioned router) to send to and receive data from the game cloud server. Thus, while the client device may still be required to receive video output from the cloud-based video game and render it on a local display, input latency can be reduced by allowing the controller to send inputs directly over the network to the game cloud server, bypassing the client device.

In one embodiment, a networked controller and client device can be configured to send certain types of inputs directly from the controller to the game cloud server, and other types of inputs via the client device. For example, inputs whose detection does not depend on any additional hardware or processing apart from the controller itself can be sent directly from the controller to the game cloud server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the game cloud server. These might include captured video or audio from the game environment that may be processed by the client device before sending to the game cloud server. Additionally, inputs from motion detection hardware of the controller might be processed by the client device in conjunction with captured video to detect the position and motion of the controller, which would subsequently be communicated by the client device to the game cloud server. It should be appreciated that the controller 120 in accordance with various embodiments may also receive data (e.g. feedback data) from the client device or directly from the game cloud server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for determining behavior of a player playing a video game, comprising:
    assigning a behavioral value point for the player playing the video game and for each game item in a gaming scenario of the video game currently accessed by the player;
    detecting game inputs provided by the player in the gaming scenario, the game inputs of the player interpreted to define an action directed toward a specific game item in the gaming scenario;
    evaluating effect of the action to identify predefined adjustment value points defined for the action and for an amount of effect of the action on each said game item affected by said action;
    dynamically computing a change in the behavioral value points for the player and for each game item affected by the action of the player, the change determined by applying the predefined adjustment value points defined for the action and for the amount of effect caused by the action on each said game item affected by said action to the corresponding behavioral value points assigned to the player and for each game item affected by the action; and
    examining the change in the behavioral value points for the player and for each game item affected by the action to establish if the player is exhibiting good behavior or bad behavior.

2. The method of claim 1, wherein evaluating the effect of the action includes,
    identifying a time stamp associated with the action initiated by the game inputs of the player;
    correlating the action to changes occurring in the gaming scenario of the game to identify the game items affected by the action, the correlation performed using the time stamp of the action;
    evaluating the changes in each game item resulting from the action to define the effect of the action on the respective game item.

3. The method of claim 1, wherein when the action of the player affects only a specific game item in the gaming scenario in accordance to objective of the video game, incrementing the behavioral value point of the player and correspondingly decrementing the behavioral value point of the specific game item by the corresponding predefined adjustment value point defined for the player and for the amount of effect caused by the action.

4. The method of claim 1, wherein dynamically computing the change in the behavioral value points further includes,
    maintaining a positive value point log and a negative value point log for the player and for each game item in the gaming scenario; and
    updating the positive value point log or the negative value point log of the player and of each game item affected by the action by a corresponding predefined adjustment value point, based on the amount of effect caused by the action on each game item affected by the action.

5. The method of claim 4, wherein the positive value point log and the negative value point log for the player is maintained for the video game and includes data from a plurality of game sessions of the video game, the positive and negative value point logs updated during current game session of the video game.

6. The method of claim 4, wherein the positive value point log and the negative value point log for the player is maintained for a plurality of video games played by the player and updated during current game session of the video game.

7. The method of claim 4, wherein when the action targeting the specific game item affects only the specific game item and is in accordance to game objectives of the video game, updating the positive value point log of the player using the predefined adjustment value point defined for the action, and
    wherein when the action targeting the specific game item affects a different game item instead of the specific game item, incrementing the negative value point log of the player by the predefined adjustment value point defined for the action.

8. The method of claim 4, wherein when the action targeting the specific game item affects only the specific game item in accordance to game objectives of the video game, updating the negative value point log of the specific game item using the predefined adjustment value point identified for the amount of effect caused by the action,
    when the action targeting the specific game item affects a different game item instead of the specific game item, updating the negative value point log of the different game item using the predefined adjustment value point defined for the amount of effect caused by the action, and
    when the action targeting the specific game item affects the specific game item and a different game item, updating the negative value point log of each of the specific game item and the different game item using the predefined adjustment value point defined for the amount of effect caused by the action.

9. The method of claim 4, wherein updating the positive value point log and the negative value point log includes,
generating an entry using the adjustment value point identified for the action and for each game item affected by the action in the corresponding positive value point log and the negative value point log maintained for the player and for each game item, wherein the positive value point log and the negative value point log includes a plurality of entries identified for different actions of the player in the video game; and
wherein computing the change for the action includes,
aggregating the adjustment value points collected in the positive value point logs of the player and of each of the game items affected by the action to generate a consolidated positive adjustment value point for the player, and aggregating the adjustment value points collected in the negative value point logs of the player and of each of the game items affected by the action to generate a consolidated negative adjustment value point for the player, wherein the consolidated positive adjustment value point and the consolidated negative adjustment value point quantifies the effect of change that occurred in the gaming scenario due to the action.

10. The method of claim 9, wherein evaluating the change further includes,
comparing the consolidated positive adjustment value point with the consolidated negative adjustment value point for the player;
when the consolidated positive adjustment value point is greater than the consolidated negative adjustment value point by at least a predefined threshold value, establishing that the player performing the action is exhibiting good behavior during game play of the video game; and
when the consolidated negative adjustment value point is greater than the consolidated positive adjustment value point for the player by the predefined threshold value, establishing that the player performing the action is exhibiting bad behavior during game play of the video game, and
wherein the consolidated positive adjustment value point and the consolidated negative adjustment value point used to update the behavioral value point of the player, the updated behavioral value point of the player used for evaluating subsequent action of the player in the video game.

11. The method of claim 9, wherein evaluating the change further includes,
comparing the consolidated positive adjustment value point and the consolidated negative adjustment value point against a predefined threshold value,
when the consolidated positive adjustment value point is greater than the predefined threshold value, declaring the player is exhibiting good behavior by their action; and
when the consolidated negative adjustment value point is greater than the predefined threshold value, declaring the player is exhibiting bad behavior by their action, and
wherein the consolidated positive adjustment value point and the consolidated negative adjustment value point used to update the behavioral value point of the player, the updated behavioral value point of the player used for evaluating subsequent action of the player in the video game.

12. The method of claim 4, wherein evaluating the change includes,
aggregating the adjustment value points collected in the positive value point log of the player to generate an aggregate positive value, and aggregating the adjustment value points collected in the negative value point log of the player to generate an aggregate negative value for the player;
when the aggregate positive value is greater than or equal to a predefined threshold value, establishing that the player is exhibiting good behavior through their action in the video game; and
when the aggregate negative value is greater than or equal to the predefined threshold value, establishing that the player is exhibiting bad behavior through their action in the video game, and
wherein the aggregate positive value and the aggregate negative value used to update the behavioral value point of the player, the updated behavioral value point of the player used for evaluating subsequent action of the player in the video game.

13. The method of claim 1, further includes storing the behavioral value points with the change for each of the player and the game items affected by the action of the player for use in evaluating subsequent action of the player in the video game.

14. The method of claim 1, wherein when the player exhibits good behavior, providing incentive to the player, wherein the incentive is monetary or game-related.

15. The method of claim 1, wherein when the player exhibits bad behavior, penalizing the player, wherein the penalizing is game-related.

16. The method of claim 1, wherein when the player exhibits bad behavior, providing a warning to the player, wherein the warning includes information related to the action that caused the player to exhibit bad behavior and provide guidance to encourage the player to correct the action.

17. The method of claim 1, wherein the adjustment value point for applying to the behavioral value points of the player and of each game item affected by the action of the player is dynamically determined based on a type and amount of effect the action had on each game item affected by the action of the player in the gaming scenario; and
wherein the change in the behavioral value point for the player includes change in the behavioral value point for each said game item affected by said action of the player.

18. The method of claim 1, wherein the video game is a streaming video game that is accessed from a game cloud system.

19. A method for determining behavior of a player playing a video game, comprising:
assigning a behavioral value point for the player playing the video game and for each game item in a gaming scenario of the video game currently accessed by the player;
detecting an action performed by the player in the gaming scenario, wherein the action is directed toward a specific game item in the gaming scenario;
identifying a player adjustment value for adjusting the behavioral value point of the player and a game item adjustment value for adjusting the behavioral value point for each game item in the gaming scenario affected by the action of the player, the player adjustment value determined from game play metrics of other players that have performed the action during game play of the video game and the game item adjustment value for each game item determined based on an amount of effect caused by the action on each said game item affected by said action;

dynamically adjusting the behavioral value point for the player using the player adjustment value, and dynamically adjusting the behavioral value point for each game item affected by the action of the player using the corresponding game item adjustment value identified for the amount of effect of the action on the respective game item; and evaluating the adjusted behavioral value points for the player and for each game item affected by the action to establish if the player is exhibiting good behavior or bad behavior.

20. The method of claim 19, further includes storing the adjusted behavioral value points for the player and for each game item in the gaming scenario of the video game affected by the action of the player, and using the adjusted behavioral value points for evaluating subsequent action of the player within the video game.

21. The method of claim 19, wherein the game item adjustment value identified for each game item affected by the action is representative of amount of effect the action had on the respective game item.

22. The method of claim 19, wherein the adjusted behavioral value point for the player is used for evaluating behavior of the player in other video games.

23. The method of claim 19, wherein the adjusted behavioral value point for the player is used for evaluating behavior of other players in the video game or in other video games.

* * * * *